(12) United States Patent
Patton

(10) Patent No.: US 7,219,630 B2
(45) Date of Patent: May 22, 2007

(54) INTERNAL COMBUSTION ENGINE WITH REGENERATOR, HOT AIR IGNITION, AND NATURALLY ASPIRATED ENGINE CONTROL

(76) Inventor: Richard Patton, 112 Planters Row, Starkville, MS (US) 39759

( * ) Notice: Subject to any disclaimer, the term of this patent is extended or adjusted under 35 U.S.C. 154(b) by 0 days.

(21) Appl. No.: 11/284,021

(22) Filed: Nov. 21, 2005

(65) Prior Publication Data
US 2006/0137631 A1    Jun. 29, 2006

Related U.S. Application Data

(63) Continuation-in-part of application No. 10/638,208, filed on Aug. 8, 2003, now Pat. No. 7,004,115, which is a continuation-in-part of application No. 09/978,151, filed on Oct. 16, 2001, now Pat. No. 6,606,970, which is a continuation-in-part of application No. 09/651,482, filed on Aug. 30, 2000, now Pat. No. 6,340,004.

(60) Provisional application No. 60/151,994, filed on Sep. 1, 1999.

(51) Int. Cl.
*F01B 29/04* (2006.01)
*F02B 25/00* (2006.01)
*F02B 33/44* (2006.01)
*F02B 47/02* (2006.01)
*F02G 5/00* (2006.01)

(52) U.S. Cl. .................. 123/25 C; 123/70 R; 123/543; 60/605.1; 60/712

(58) Field of Classification Search ............ 123/25 C, 123/68, 69, 70 R, 72, 543, 556, 559.1; 60/605.1, 60/712
See application file for complete search history.

(56) References Cited

U.S. PATENT DOCUMENTS

| 155,087 A | 9/1874 | Hirsch |
| 1,111,841 A | 9/1914 | Koenig |
| 1,523,341 A | 1/1925 | Della-Ferrera |

(Continued)

FOREIGN PATENT DOCUMENTS

DE    40 24 558    2/1992

(Continued)

OTHER PUBLICATIONS

Van Wylen, Gordon J. and Sonntag, Richard E., Fundamentals of Classical Thermodynamics. 1978, pp. 277-283 (John Wiley & Sons, Inc., New York, NY).

(Continued)

*Primary Examiner*—Noah P. Kamen
(74) *Attorney, Agent, or Firm*—Roberts Mardula & Wertheim, LLC

(57) ABSTRACT

An internal combustion engine and method is disclosed wherein separate compression and power cylinders are used and a regenerator or pair of regenerators is mounted between them to provide heat for hot-air ignition. The single regenerator embodiment operates as a two-stroke cycle engine and the embodiment with an alternating pair of regenerators operates as a four-stroke cycle engine. The engine varies the amount of air entering the power cylinder to control the engine output during naturally aspirated operation using valve timing and/or volume control of dead space and can optionally include supercharging to control the engine at higher output levels.

22 Claims, 19 Drawing Sheets

U.S. PATENT DOCUMENTS

| | | | |
|---|---|---|---|
| 1,579,332 | A | 4/1926 | Metten |
| 1,682,111 | A | 8/1928 | Bronander |
| 1,751,385 | A | 3/1930 | Beaudry |
| 1,773,995 | A | 8/1930 | Goldsborough |
| 1,904,816 | A | 4/1933 | Beaudry |
| 2,048,051 | A | 7/1936 | Barkeij |
| 2,058,705 | A | 10/1936 | Maniscalco |
| 2,516,708 | A | 7/1950 | Lugt |
| 2,897,801 | A | 8/1959 | Kloss |
| 2,928,506 | A | 3/1960 | Goldman |
| 3,675,630 | A | 7/1972 | Stratton |
| 3,842,808 | A | 10/1974 | Cataldo |
| 3,872,839 | A | 3/1975 | Russell et al. |
| 4,004,421 | A | 1/1977 | Cowans |
| 4,026,114 | A | 5/1977 | Belaire |
| 4,074,533 | A | 2/1978 | Stockton |
| 4,157,080 | A | 6/1979 | Hill |
| 4,280,468 | A | 7/1981 | Millman |
| 4,364,233 | A | 12/1982 | Stang |
| 4,630,447 | A | 12/1986 | Webber |
| 4,781,155 | A | 11/1988 | Brucker |
| 4,790,284 | A | 12/1988 | Ferrenberg et al. |
| 4,791,787 | A | 12/1988 | Paul et al. |
| 4,928,658 | A | 5/1990 | Ferrenberg et al. |
| 4,936,262 | A | 6/1990 | Paul et al. |
| 5,050,570 | A | 9/1991 | Thring |
| 5,072,589 | A | 12/1991 | Schmitz |
| 5,085,179 | A | 2/1992 | Faulkner |
| 5,228,415 | A | 7/1993 | Williams |
| 5,275,134 | A | 1/1994 | Springer |
| 5,465,702 | A | 11/1995 | Ferrenberg |
| 5,499,605 | A | 3/1996 | Thring |
| 5,526,778 | A | 6/1996 | Springer |
| 5,540,191 | A | 7/1996 | Clarke |
| 5,632,255 | A | 5/1997 | Ferrenberg |
| 5,857,436 | A | 1/1999 | Chen |
| 6,095,100 | A | 8/2000 | Hughes |

FOREIGN PATENT DOCUMENTS

| | | |
|---|---|---|
| FR | 2 291 351 | 6/1976 |
| JP | 56-27031 | 3/1981 |
| WO | WO 99/30017 | 6/1999 |

OTHER PUBLICATIONS

Wark, Kenneth, Thermodynamics (Fourth Edition). 1983, pp. 550-554 (McGraw-Hill Book Company, U.S.A.).

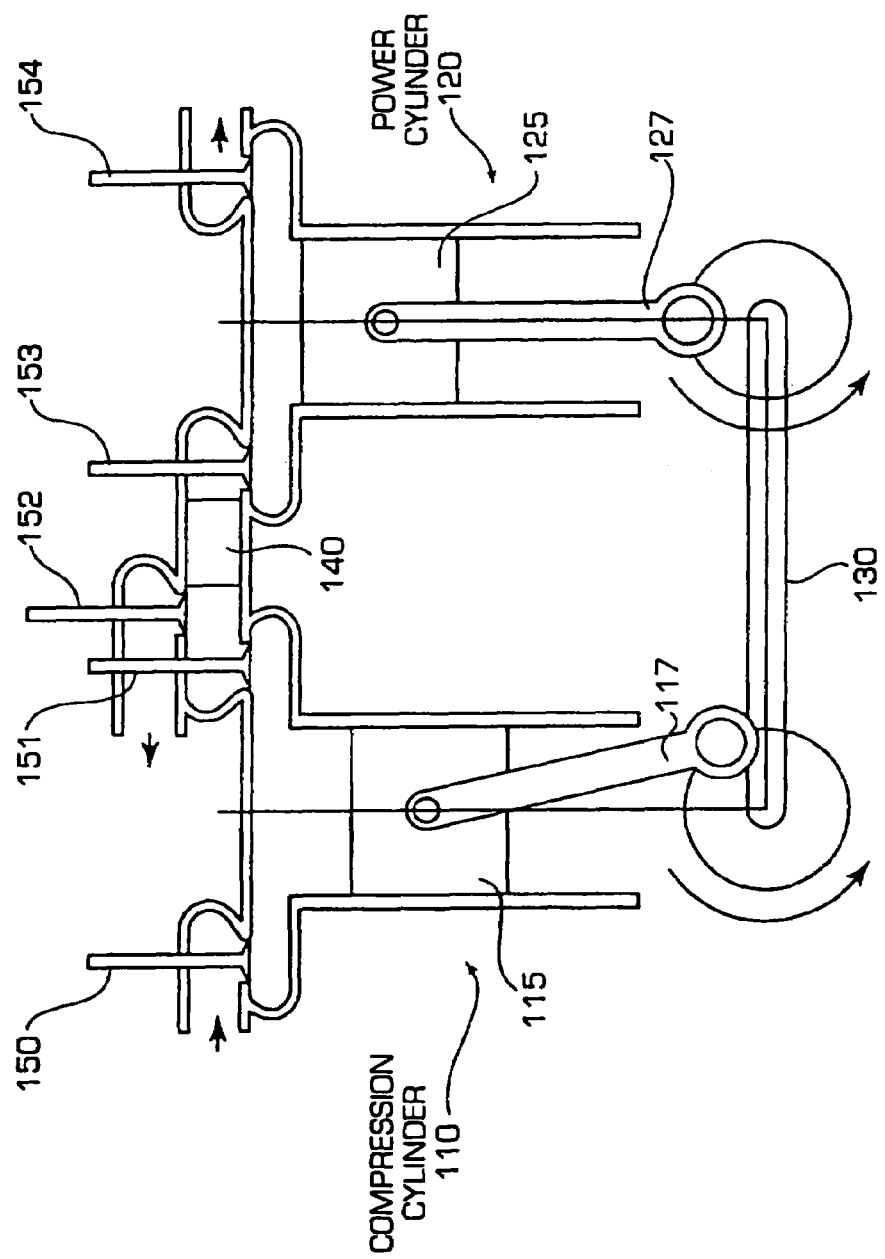

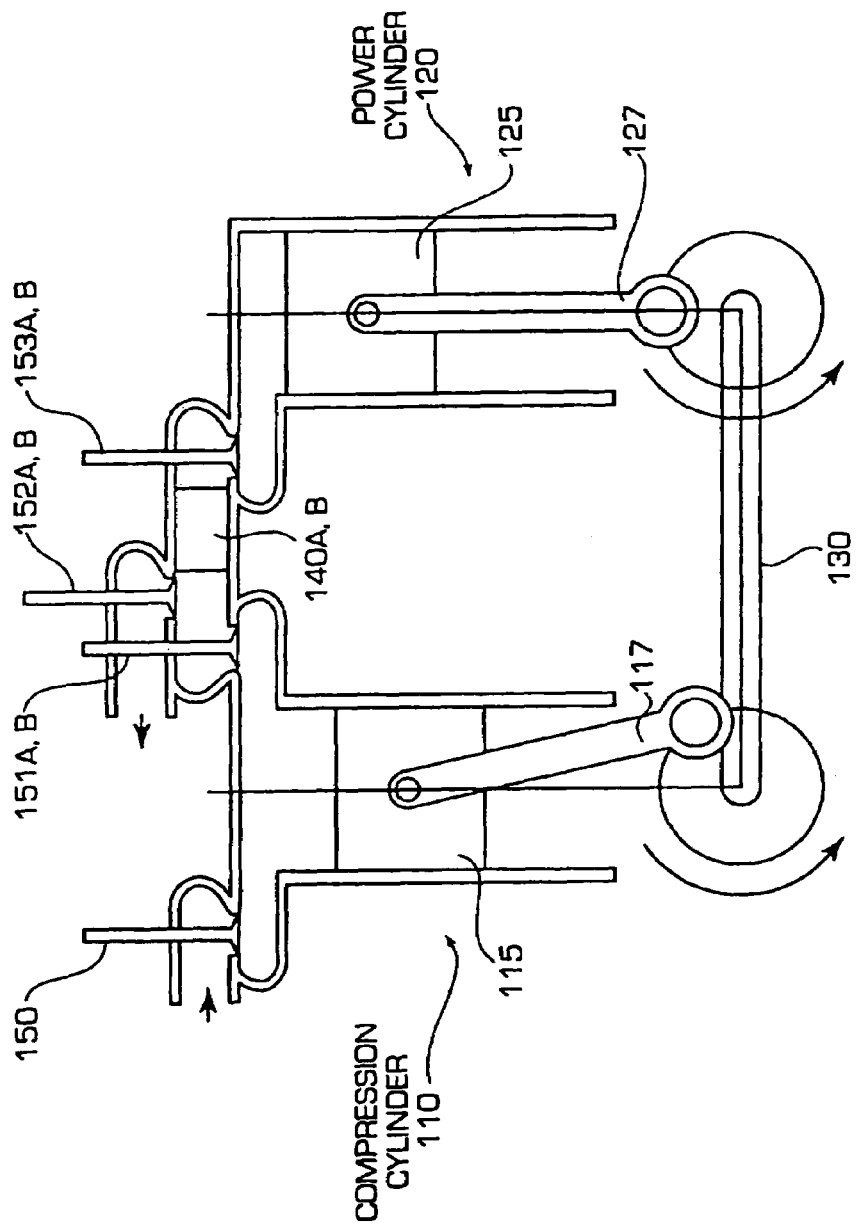

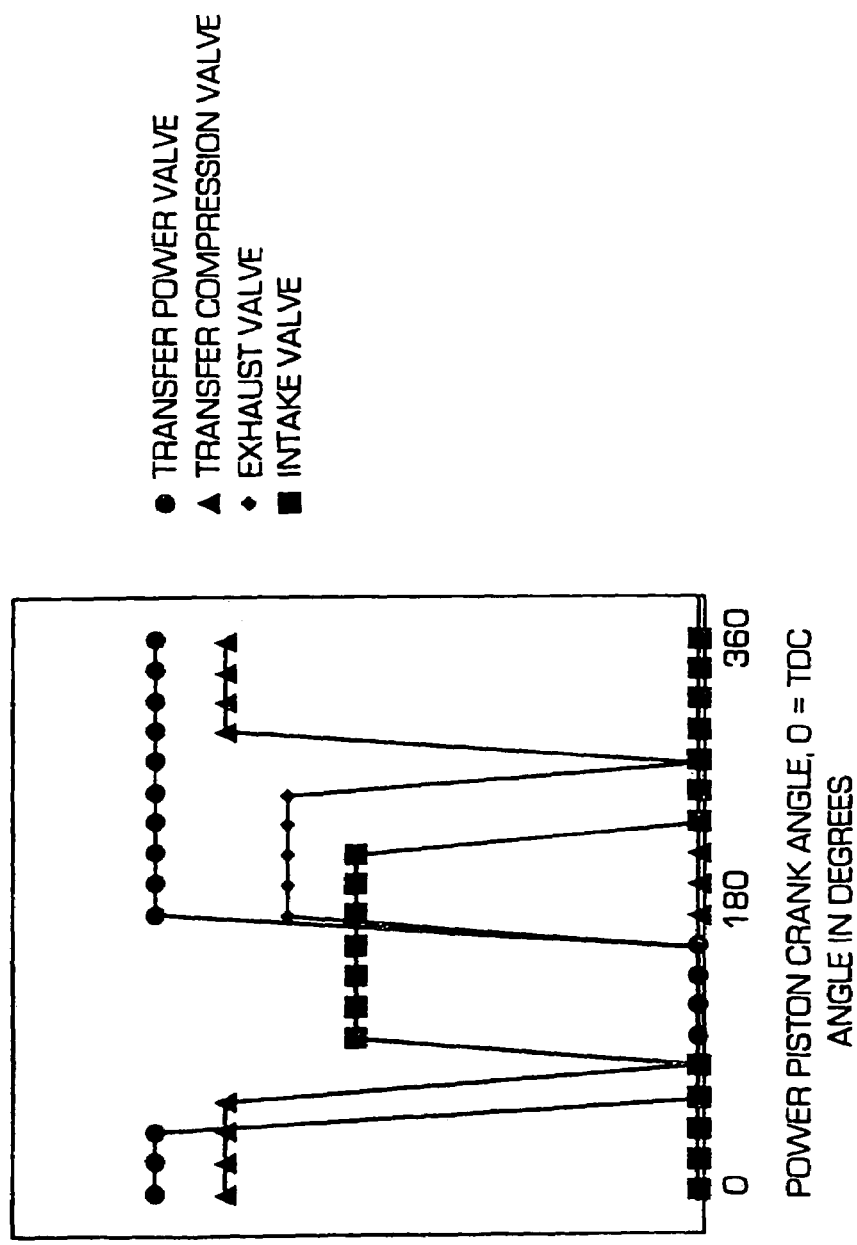

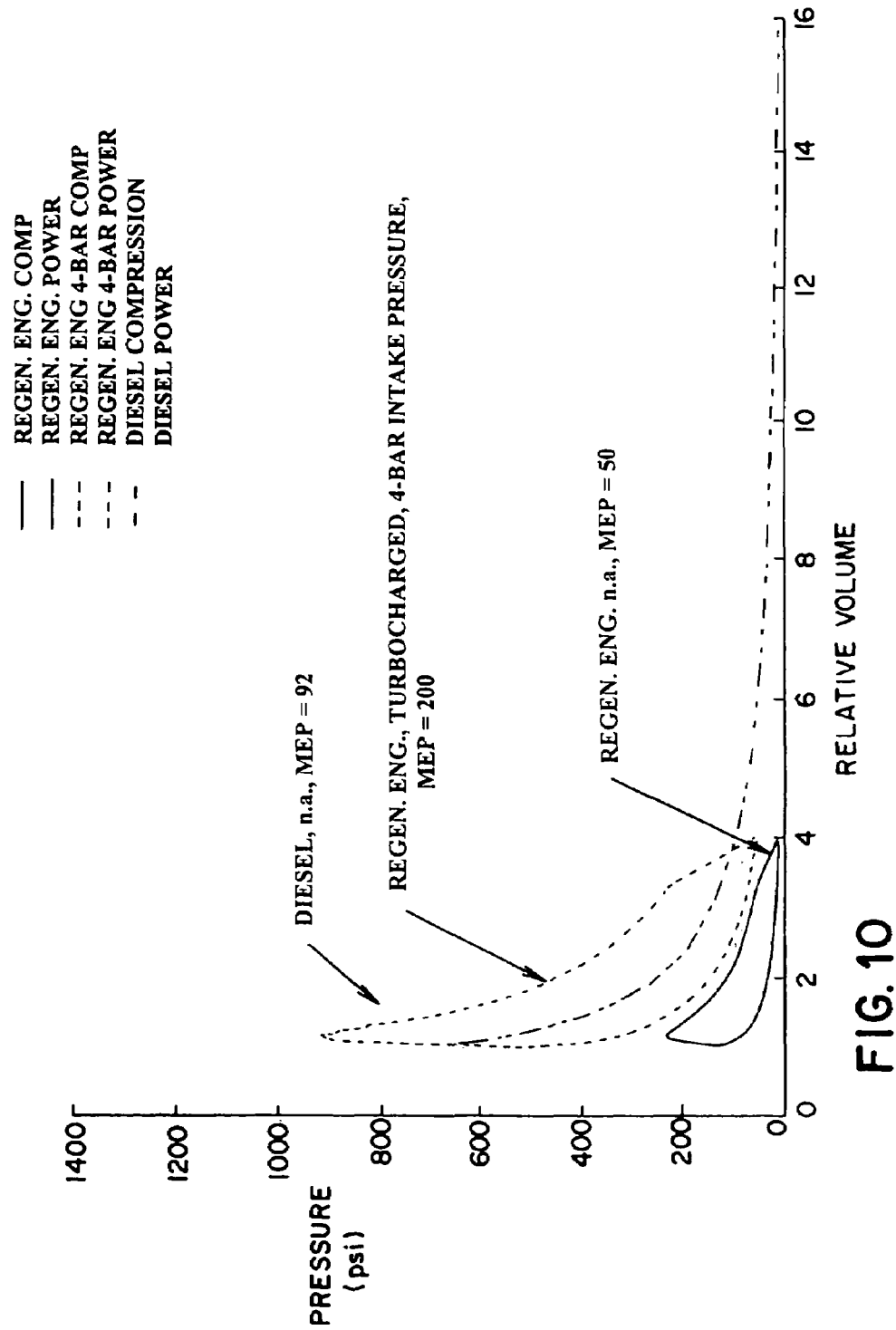

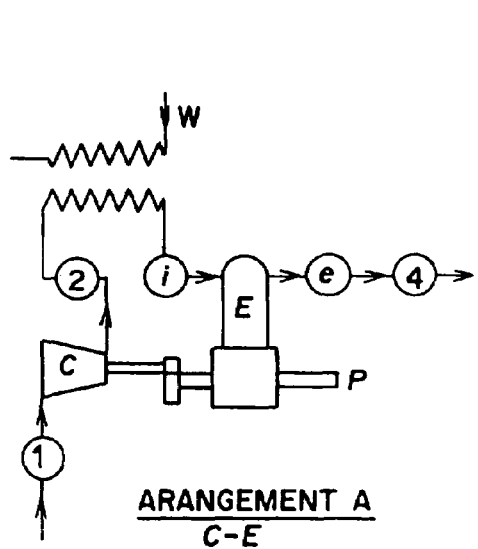
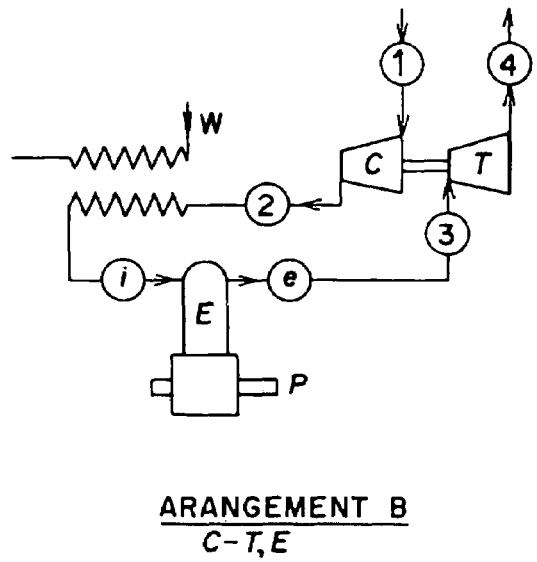
FIG. 11  FIG. 12
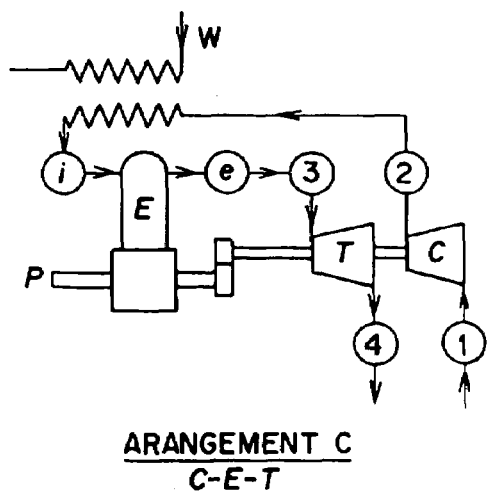
FIG. 13
COMPRESSOR-ENGINE-TURBINE ARRANGEMENTS: $C$ INDICATES COMPRESSOR; $E$ INDICATES ENGINE; $P$ INDICATES POWER TAKE-OFF; $T$ INDICATES TURBINE; $W$ INDICATES COOLANT ENTERING AFTERCOOLER.

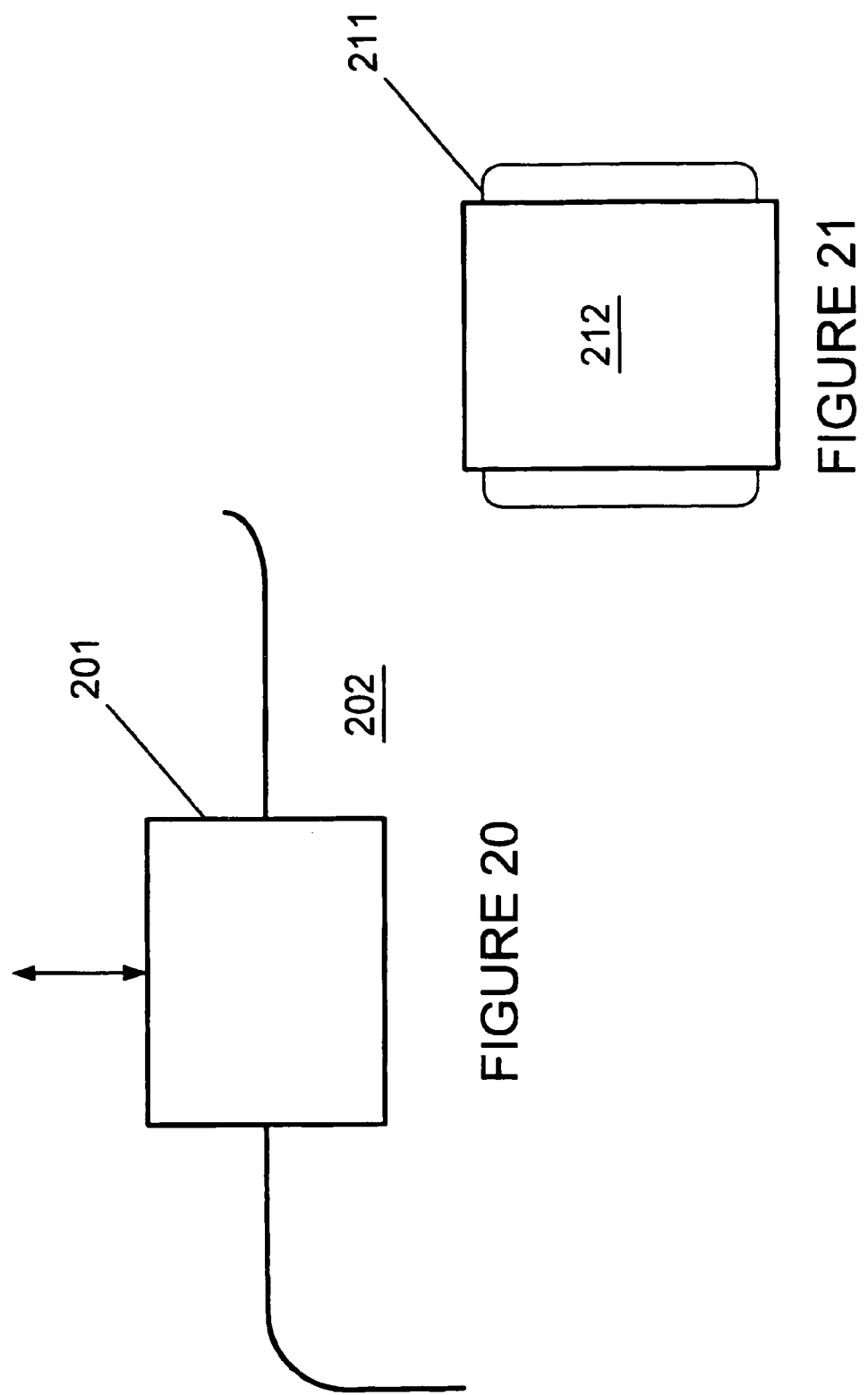

INTERNAL COMBUSTION ENGINE WITH REGENERATOR, HOT AIR IGNITION, AND NATURALLY ASPIRATED ENGINE CONTROL

RELATED APPLICATIONS

This application is a continuation in part of application Ser. No. 10/638,208 filed Aug. 8, 2003, now U.S. Pat. No. 7,004,115; which is a continuation in part of application Ser. No. 09/978,151 filed Oct. 16, 2001, now U.S. Pat. No. 6,606,970, which is a continuation in part of application Ser. No. 09/651,482 filed Aug. 30, 2000, now U.S. Pat. No. 6,340,004, which claims the benefit of Provisional Application Ser. No. 60/151,994, filed Sep. 1, 1999, all of which are incorporated herein by reference.

FIELD OF THE INVENTION

This invention relates to the field of internal combustion engines, and in particular to the control of the regenerative engines disclosed in the present inventor's U.S. Pat. Nos. 6,340,004 and 6,606,970 when the engines are naturally aspirated.

BACKGROUND OF THE INVENTION

As discussed in U.S. Pat. No. 6,340,004, the fuel economy of vehicles primarily depends on the efficiency of the mover that drives the vehicle. It is well recognized that the current generation of internal combustion (IC) engines lacks the efficiency needed to compete with fuel cells and other alternative vehicle movers. At least one study has recommended that auto manufacturers cease development of new IC engines, as they may be compared to steam engines—they are obsolete. The present invention is directed to an IC engine that is competitive with fuel cells in efficiency.

The following principles must be embodied in one engine in order for the engine to achieve maximum efficiency.

1) Variable Fuel Ratio and Flame Temperature
For ideal Carnot cycle efficiency:

$$n=(T_h-T_l)/T_h$$

Where
$T_h$=highest temperature
$T_l$=lowest temperature (usually ambient temperature)
n=thermal efficiency shows that the higher the temperature, $T_h$, the higher the engine efficiency. This is not the case in real-world conditions. The basic cause of the breakdown in the Carnot cycle rule is due to the fact that the properties of air change as the temperature increases. In particular, $C_v$, the constant volume specific heat, and $C_p$, the constant pressure specific heat, increase as the temperature increases. The ratio k, on the other hand, decreases with increasing temperature. To heat 1 lb of air at constant volume by 100 degrees F. requires 20 BTU at 1000 degrees F., but 22.7 BTU at 3000 degrees F. The extra 2.7 BTU is essentially wasted. At the same time, each increment of $T_h$ adds less and less to the overall efficiency. If $T_l$ is 600 R, and $T_h$ is 1800 R (1340 degrees F.), n=0.66666. At $T_h$=3600 (3140 degrees F.), n=0.83333, and at $T_h$=5400 R (4940 degrees F.), n=0.88888. In the first instance, going from 1800 R to 3600 R netted an increase in n of 0.16666, whereas going from 3600 R to 5400 R netted only an increase in n of 0.0555, or ⅓ of the first increase. At the same time, the specific heat of air is a monotonic function of temperature, so at some point the efficiency gains from higher temperatures are offset by losses due to higher specific heats. This point is reached at around 4000 R.

The most efficient diesels are large, low swirl DI (direct injection) turbocharged 2-strokes. These are low speed engines (<400 rpm) and typically have 100%-200% excess air.

The combustion temperature is proportional to the fuel ratio. A CI (compression ignition) engine will have a theoretical flame temperature of 3000-4000 R, as opposed to the SI (spark ignition) engine, which has a theoretical flame temperature of 5000 R. Note also that the reason the specific heat is increased is due to increased dissociation of the air molecules. This dissociation leads to increased exhaust pollution.

Ricardo increased the indicated efficiency of an SI engine by using hydrogen and reducing the fuel ratio to 0.5. The efficiency increased from 30% to 40%.

Hydrogen is the only fuel which can be used in this fashion. There are 2 basic types of ignition—spark and compression. The engine disclosed in U.S. Pat. No. 6,340,004 uses hot air ignition (HAI), which allows variation in the fuel ratio similar to CI, but with the additional advantage that HAI does not require the engine do work to bring the air up to the temperature where it can be fired. All engines which claim to be efficient must use an ignition system which allows wide variations in the fuel ratio. An incidental advantage of this design is that because molecular dissociation is much less at lower temperatures, the resulting exhaust pollution (species such as nitrous oxide, ozone, etc) is also lessened.

2) Uniflow Design

Uniflow design, although it is more critical to a Rankine cycle engine, such as the Stumpf Unaflow steam engine, is also of importance to an IC engine. Generally speaking, in a uniflow design, the motion of the working fluid into and out of the cylinder does not cause degradation of the cycle efficiency. The uniflow design minimizes unwanted heat transfer between engine surfaces and the working fluid. Only two-stroke cycle IC engines can claim some kind of uniflow design.

Consider the typical four-stroke cycle Diesel engine:

1) Intake—Air picks up heat from the intake valve and from the hot head, piston and cylinder. Generally speaking, the air heats up from 100-200 F.

2) Compression—The air continues picking up heat, in addition to the work done on it by the engine.

3) Power—Air is hot after firing, and begins to lose heat to the walls. Luminosity of the diesel combustion process accounts for much of the heat lost. The short cycle time of a high speed Diesel engine holds these heat losses by conduction to a minimum.

4) Exhaust—During the blowdown, heat is transferred to the exhaust valve, and hence to the cylinder head.

The engine of the present invention has separate cylinders for intake/compression and for power/exhaust. The intake/compression cylinder is cool, and in fact during the intake and compression process, efforts can be made to create a nearly isothermal compression process by adding water droplets to the intake air. Addition of water droplets is optional and is not essential to the design, which has had its efficiency calculations performed without taking water droplet addition into account.

Addition of water droplets, of course, is impossible with a Diesel engine. A variation on this is used in SI engines, where the heat of vaporization of the fuel keeps the temperature down during compression. This is one reason why methanol, which has a high heat of vaporization, is used in some high performance engines.

The power/exhaust cylinder is the 'hot' cylinder, with typical head and piston temperatures in the range of 1000-1100 F. This necessitates the use of 18/8 (SAE 300 series) stainless steels for the head and piston, and superalloys for the valves. Any other suitable high temperature material, such as ceramics, can also be used in the application. Combustion temperatures are in the neighborhood of 2000-3000 F. The high heat of the combustion chamber prior to combustion reduces the heat transfer from the working fluid to the chamber during the power stroke. It also reduces the radiant heat transfer, however the larger reduction in radiant heat transfer comes from keeping the maximum temperature below 3000 F.

Thus, unwanted heat transfer is minimized in the engine of the present invention.

There are several dissociation reactions which become important absorbers of heat above 3000 F. The two most important are:

a) 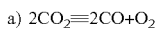 $2CO_2 \equiv 2CO + O_2$ b) 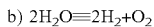 $2H_2O \equiv 2H_2 + O_2$

The production of CO, carbon monoxide, is particularly undesirable, as it is a regulated pollutant. All of these reactions also reduce the engine efficiency.

3) Regenerator

In the use of a regenerator, the state of the art is not yet commercially feasible.

The principle of using a regenerator is not new. Siemens (1881) patented an engine design which was a forerunner of the engine of the present invention. It had a compressor, the air traveling from the compressor through the regenerator and into the combustion chamber. There are, however, some basic differences between the Siemens engine and the engine of the present invention:

1) Siemens proposed using the crankcase, rather than a separate cylinder, to compress the air. The engine appears to be a variation of Clerk's two-stroke cycle engine (1878). The engine features are:

a) All of the compression occurs in the crankcase b) Max compression occurs at the wrong time on the stroke. It should occur at piston TDC, not BDC. This is remedied by use of a reservoir. This greatly increases the compression work.

c) It is not clear that the Siemens engine can vary the fuel ratio. It is a spark ignition engine. Ignition is aided by adding oil to the regenerator as the fresh charge is passing through it.

d) The Siemens engine had the regenerator as part of the top of the cylinder head. The regenerator is exposed to the hot flame, and some burning occurs in the regenerator.

In the engine of the present invention, the compressor takes in a charge of air, compresses it and then transfers the entire charge through the regenerator. The compressed charge includes the space taken up by the regenerator. At TDC of the power piston, (60 deg. bTDC of the compressor) the valve opens and the charge flows from the compressor to the power cylinder. Near TDC of the compressor, fuel is sprayed into the power cylinder. Dead air is minimized throughout the system in order to realize the benefits of the regenerator and minimize compressor work. During combustion, the regenerator is separated from the burning gases by a valve.

Hirsch (U.S. Pat. No. 155,087) has two cylinders, passages between them, and a regenerator. Air from explosion in the hot cylinder is forced from the hot cylinder to the cold cylinder, where jets of water are used to cool the air and form a vacuum. It appears to be a hot air engine, does not specify an ignition system, and contains a pressure reservoir.

Koenig (U.S. Pat. No. 1,111,841) is similar in design to the engine of the present invention. It has a power cylinder and a compression cylinder and a regenerator in between. It does not specify the method of firing the power piston, and the valving is somewhat different. In particular, the inventor failed to specify a valve between the power piston and the regenerator. This results in the air charge being transferred from the compression cylinder into a regenerator at atmospheric pressure. As the compression cylinder is smaller than the engine cylinder, this will cause a loss of pressure during the transfer process.

Ferrera (U.S. Pat. No. 1,523,341) discloses an engine with 2 cylinders and a common combustion chamber. It differs substantially from engine of the present invention.

Metten (U.S. Pat. No. 1,579,332) discloses an engine with 2 cylinders and a combustion chamber between them.

Ferrenberg (see U.S. Pat. Nos. 5,632,255, 5,465,702, 4,928,658, and 4,790,284) has developed several patents drawn to a movable thermal regenerator. The engine of the present invention has a fixed regenerator.

Clarke (U.S. Pat. No. 5,540,191) proposed using cooling water in the compression stroke of an engine with a regenerator.

Thring (U.S. Pat. No. 5,499,605) proposed using a regenerator in a gasoline engine. That invention differs greatly from present hot-air ignition system.

Paul (U.S. Pat. Nos. 4,936,262 and 4,791,787) proposed to have a regenerator as a liner inside the cylinder.

Bruckner (U.S. Pat. No. 4,781,155) has some similarities to the engine of the present invention. In this patent, fresh air is admitted to both the power cylinder and the compression (supercharger) cylinder. This differs from the engine of the present invention, as fresh air is only admitted to the compression cylinder. In addition, there is no valving controlling the flow of air through the regenerator. The cylinders are out of phase, but the phasing varies.

Webber (U.S. Pat. No. 4,630,447) has a spark-ignition engine in which there are two cylinders out of phase with each other, with a regenerator in between. However, there is no valving controlling the movement of air in the regenerator as with the present invention.

Millman (U.S. Pat. No. 4,280,468) has a single cylinder engine in which a regenerator is placed between the intake and exhaust valves on the cylinder head. Very different from the engine of the present invention.

Stockton (U.S. Pat. No. 4,074,533) has a modified Sterling/Ericsson engine with intermittent internal combustion and a regenerator.

Cowans (U.S. Pat. No. 4,004,421) has a semi-closed loop external combustion engine.

Several U.S. patents were mentioned in the above patents. The most common for the closely allied patents were: U.S. Pat. Nos. 1,682,111, 1,751,385, 1,773,995, 1,904,816, 2,048,051, 2,058,705, 2,516,708, 2,897,801, 2,928,506, 3,842,808, 3,872,839, 4,026,114, 4,364,233, 5,050,570, 5,072,589, 5,085,179, and 5,228,415.

4) Low Friction & Compression Ratio

In a regenerative engine scheme, the compression ratio needs to be low. It turns out that having a low compression (and expansion) ratio has the following advantages:

1) low friction mean effective pressure (fmep). Fmep consists of rubbing and accessory mep (ramep) and pumping mep (pmep). Because the engine of the present invention is not throttled, there is very little pmep. The pmep in the engine of the present invention will primarily come from transfer of the air from the compression to the power cylinder and is generally no more than 1-2 psi at 1800 rpm. Ramep should be very low, as peak pressures are low and compression ratios are low.

2) Efficiency is high. This is due to the fact that the waste heat is recovered from the exhaust. It is more efficient to have a low compression ratio and recover much waste heat than it is to have a high compression ratio and recover a small amount of waste heat. The low compression ratio engine acts much more like a Sterling engine and hence its maximum possible efficiency is greater.

Almost by definition, a high friction engine cannot be efficient. None of the engines with regenerators in the patents mentioned having a low compression ratio, except Webber (U.S. Pat. No. 4,630,447), which has a 4:1 compression ratio. Webber also calls his engine an "open cycle Sterling engine."

The current state of the art as commercially practiced does not produce engines that have adequate fuel economy. The state of the art as practiced in the patent literature does not adequate regulate the air flow through the regenerator. For example, in Webber's patent, hot gases can transfer unimpeded from the hot side to the cool side after firing. As these hot gases are expanding, the reduction in volume in this movement causes loss of power and efficiency. The regenerator picks up combustion heat, not exhaust heat.

For the regenerative engine, it is necessary, both for pollution control and for proper operation, to maintain the fuel ratio, Fr, within a narrow band. This band is defined by: 1) A lower bound, which is necessitated because the engine requires sufficient temperature in the regenerator, which implies that the gas temperature at the end of the expansion stroke be above a certain minimum (this implies that there is a lower bound to Fr); and 2) An upper bound, which is necessitated because the engine gets most of its cooling from internal gasses. A gas temperature which is too high will melt the components, and also cause problems with NOx control.

In essence, then, control of the engine requires control of the amount of air entering the combustion chamber. High turbo or supercharging rates can provide additional air so that, as long as the engine operates at a level above the naturally aspirated level, control at these power levels can be performed through the (turbo) supercharger. However, there is still the question of a reliable method of controlling a naturally aspirated (NA) engine.

The engine control strategy of the present inventor's engines disclosed in U.S. Pat. Nos. 6,340,004 and 6,606,970 can be divided into two regimes: engine control when the engine is turbo or supercharged; and engine control when the engine is naturally aspirated. The control regime when the engine is turbo or supercharged has been disclosed in co-pending U.S. application Ser. No. 10/638,208. The present invention is drawn to control when the engine is naturally aspirated.

BRIEF SUMMARY OF THE INVENTION

The internal combustion engine of the present invention combines the fuel-saving features of a operating over a wide range of conditions within a narrow, efficient fuel ratio, low flame temperature, low heat losses, and high volumetric efficiency by using separate compression and power cylinders connected by a regenerator with a uniflow design so as to enable hot air ignition, and further includes the advantages of improved engine control when the engine is naturally aspirated (NA). Control of the NA engine of the present invention is accomplished through controlled valve timing.

It is therefore an object of the invention to provide an internal combustion engine having extremely high efficiency.

It is a further object of the invention to provide an internal combustion engine that produces very little pollution.

It is therefore an object of the invention to provide an internal combustion engine having a peak pressure less than that of the diesel engine, but having a MEP that is more than twice that of a diesel engine.

It is a further object of the invention to provide a hot air ignition internal combustion engine having engine control without throttling.

BRIEF DESCRIPTION OF THE DRAWINGS

FIG. 2 illustrates a five-valve engine of the present invention.

FIGS. 3*a-b* illustrate a seven-valve engine of the present invention.

FIG. 4 illustrates a typical valve opening diagram of a four-valve engine of the present invention.

FIG. 10 illustrates cycle pressures of the engine of the present invention relative to other engines.

FIG. 11 illustrates a typical supercharged embodiment of the engine of the present invention.

FIG. 12 illustrates a typical turbocharged embodiment of the engine of the present invention.

FIG. 13 illustrates a typical turbo-compounded embodiment of the engine of the present invention.

FIG. 20 illustrates a structure to change the volume of the cold dead space in an embodiment of the present invention.

FIG. 21 illustrates means for cooling the compression cylinder in an embodiment of the present invention.

DETAILED DESCRIPTION OF THE INVENTION

Figure 1:
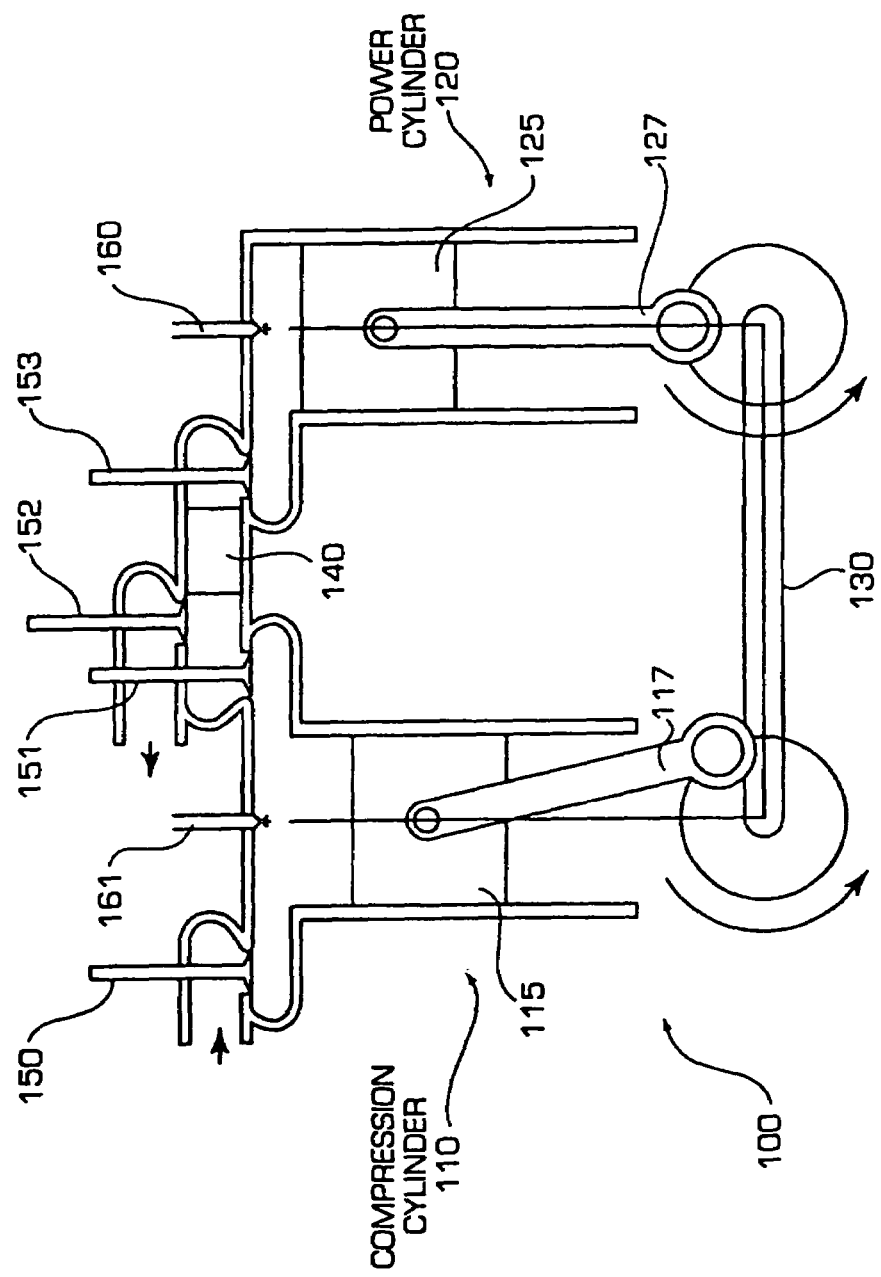
FIG. 1 illustrates a four-valve engine of the present invention.

The engine of the present invention has separate cylinders for intake/compression (compression cylinder) and for power/exhaust (power cylinder). The compression cylinder is cool, and in fact during the intake and compression process, efforts can be made to create a nearly isothermal compression process by optionally adding water droplets to the intake air.

The power cylinder is the 'hot' cylinder, with typical head and piston temperatures in the range of 1000-1100 F. This necessitates the use of 18/8 (SAE 300 series) stainless steels for the head and piston, and superalloys for the valves. Combustion temperatures are in the neighborhood of 2000-3000 F. The high heat of the combustion chamber prior to combustion reduces the heat transfer from the working fluid to the chamber during the power stroke. It also reduces the radiant heat transfer, however the larger reduction in radiant heat transfer comes from keeping the maximum temperature below 3000 F.

The compression and power cylinders are connected by a regenerator and the compression and power pistons are driven 30-90 degrees out of phase. The valve arrangement of the compression cylinder, regenerator and power cylinder, consisting of between four and seven valves, operates to provide a uniflow design.

In operation, the compressor takes in a charge of air, compresses it and then transfers the entire charge through the regenerator. The compressed charge includes the space taken up by the regenerator. At TDC of the power piston, (60 deg. bTDC of the compressor) the valve opens and the charge flows from the compressor to the power cylinder. Near TDC of the compressor, fuel is sprayed into the power cylinder. Dead air is minimized throughout the system in order to realize the benefits of the regenerator and minimize compressor work. During combustion, the regenerator is separated from the burning gases by a valve.

During the power stroke, the regenerator connection needs to be cut. If it isn't, the regenerator will perform unwanted transfers of gases from one side to the other. To avoid power-robbing pressure mismatches, the regenerator connection should only be altered when one or the other of the pistons is at TDC (top dead center), and it should only be opened when it is desired to transfer cool side gases to the hot side.

During the compression stroke, it is possible to open both sides of the regenerator connection. This should be done only after exhaust blowdown is completed, and when the pressures in both cylinders are relatively low.

After the compression stroke, the regenerator connection is cut between the power cylinder and the regenerator. The firing of the air takes place nearly simultaneously; the pressure rise due to the combustion helps to close the valve.

After firing, there is compressed air in the regenerator and in the passages leading between the cylinders. This compressed air is re-admitted to the compression cylinder, where it does useful work on the downstroke. This feature tends to make the engine more buildable, as the need for very small passages is reduced. The size of the regenerator and the passages has a much smaller effect on engine efficiency with this feature. This will be referred to as the "springback process," because the compressed air springs back into the compression cylinder.

As illustrated in FIGS. 1-2, the internal combustion engine 100 has a (cold) compression cylinder 110, and a (hot) power cylinder 120. Both cylinders have pistons 115 and 125 connected by connecting rods 117 and 127 to a common crankshaft 130, with the power piston 125 leading the compression piston 115 by 30-90 degrees (60 degrees shown). The cylinders 110, 120 are connected by either one or two separate regenerators 140. When the engine 100 is constructed with only one regenerator, there are two variants: a four valve configuration, as shown in FIG. 1 and a five valve configuration, as shown in FIG. 2. In the five valve configuration, the power cylinder 120 is equipped with an additional exhaust valve 154, and not all of the hot working fluid passes through the regenerator 140 on its way to the exhaust. In the four valve configuration, all of the hot working fluid passes through the regenerator 140, but some of it is pushed back into the compression cylinder 110. The fuel is fired in the power cylinder 120. The valving 150-153/154 is so arranged that the compression piston 115 compresses gas in both the cylinder 110 and in the regenerator 140, and the power piston 125 is pushed by gases in the power cylinder 120. Compressed air begins passing through the regenerator 140 to the power cylinder 120 when the power piston 125 is at TDC. At the end of the fluid transfer (near compression cylinder TDC) the valve 153 between the power cylinder 120 and the regenerator 140 is closed and the fuel is fired in the power cylinder 120. In the meantime, compressed air from the regenerator 140 and the passage(s) between the cylinders is allowed to flow back into the compression cylinder 110, where it does useful work on the downstroke. The intake valve 150 opening is delayed until after this takes place.

At this point, the intake valve 150 is opened and the valve 151 between the regenerator 140 and the compression cylinder 110 is closed. At BDC (or shortly thereafter) of the compression piston 115, the intake valve 150 is closed. At or near BDC of the power piston 125, the exhaust valve 153 is opened on the regenerator 140, the connection valve 153 is opened between the regenerator 140 and the power cylinder 120, and the hot fluid passes through the regenerator 140 and exhausts. Engine 100 will be fired by fuel injection into the power cylinder 120 near the end of fluid transfer. Heat from the regenerator 140 will be sufficient to ignite the fuel. The exhaust valve 152 on the regenerator 140 is closed sometime after the blowdown.

There are two variants of the single regenerator design, as discussed above. The typical embodiments, prior to employing the engine control refinements of the present invention, are disclosed below.

Four Valve

In the four valve design of FIG. 1, the valve 151 between the compression cylinder 110 and the regenerator 140 is opened, and the hot gases in the power cylinder 120 are pushed into the compression cylinder 110. This does not have a large effect on the efficiency, although it does tend to degrade it slightly.

The engine cycle can be broken down into a series of processes:

Power cylinder: Compression/transfer
  Ignition
  Expansion
  Exhaust
  Compression Compression cylinder: Compression/transfer
  Springback
  Intake
  Compression During the compression/transfer process of both cylinders, the intake and exhaust valves 150 and 152 are closed, but the transfer valves 151 and 153 between the cylinders are open, allowing gases to flow freely through the regenerator 140 from one cylinder to the other. Because the power cylinder 120 leads the compression cylinder 110, when the compression piston 115 approaches top dead center (TDC), the power piston 125 is on its downstroke, the gases are compressed and most of the gases are in the power cylinder 120.

During the ignition/expansion in the power cylinder 120 and springback in the compression cylinder 110, fuel is sprayed into the power cylinder 120. After an ignition delay, the mixture fires. The sharp pressure rise forces the transfer valve between the power cylinder 120 and the regenerator (which was almost closed anyway) closed, and the hot gases expand in the power cylinder 120, doing work. In the meantime, the transfer valve between the compression cylinder 110 and the regenerator has remained open, and the compressed gases in the regenerator and passages "springback" into the compression cylinder 110 and begin doing work on the compression piston.

During springback, the pressure in the compression cylinder 110 falls. As it nears atmospheric pressure, most of the work from the compressed gases in the regenerator and passages has been captured. At this time, the intake valve opens and the transfer valve between the compression cylinder 110 and the regenerator closes. The compression cylinder 110 begins the intake of fresh air for the next cycle.

About 20 degrees before bottom dead center (BDC) in the power cylinder 120, the exhaust valve is opened and the transfer valve between the power cylinder 120 and the regenerator is opened. The two valves do not need to open simultaneously. However the exhaust valve will usually open prior to the transfer valve. Gases begin exhausting out of the power cylinder 120, through the regenerator and into the atmosphere. The regenerator gains much of the heat of the exhaust, capturing it for the next cycle. The exhaust process goes through a violent blowdown, after which time the hot gases in the power cylinder 120 are at nearly atmospheric pressure. The exhaust process is normally begun before BDC so that the on the upstroke the hot gases are at near atmospheric pressure and so do not do much negative work. The exhaust process ends when the exhaust valve closes.

After the intake in the compression cylinder 110 ends (after BDC), the intake valve is closed and the gases in the compression cylinder 110 begin to be compressed. Similarly, after the exhaust process is completed, the exhaust valve is closed, also after BDC, the hot gases in the power cylinder 120 begin to be compressed. The transfer valve between the power cylinder 120 and the regenerator remains open. The timing of the compression is such that both cylinders have approximately equal pressures. The transfer valve from the compression cylinder 110 to the regenerator is opened, and the compression/transfer process is begun. Gas can again flow freely from one cylinder to the other. Because the pressures in both cylinders are nearly equal, very little work is lost by opening the compression transfer valve.

Five Valve

In this design, the transfer/compression process is altered.

A major objection to the four valve design is the re-compression of hot exhaust gases, which robs the engine of work. A complete separation of the exhaust and compression processes is achieved in the 5-valve engine. During the exhaust cycle, the valve between the power cylinder 120 and the regenerator is closed, and the rest of the exhaust process takes place through the 5th valve, which is a 2nd exhaust valve on the power cylinder 120.

There is no compression process in the power cylinder 120. After the exhaust valve and valve between the regenerator and the power cylinder 120 are closed, the valve between the regenerator and the compression cylinder 110 is opened. Compression proceeds in the compression cylinder 110 until the power cylinder 120 piston reaches TDC, at which point the transfer valve between the power cylinder 120 and the regenerator is opened, the 2nd exhaust valve is closed, and compressed air flows into the power cylinder 120. Thus, in this design, the exhaust, compression and transfer processes are distinct.

The design has two major disadvantages. One disadvantage is that the hot gases from the 2nd exhaust valve bypass the regenerator, causing heat losses. The 2nd disadvantage is that the valving is significantly more complex. In particular, the valve from the regenerator to the power cylinder 120 is only open a short period of time, which makes designing the camshaft for this design much more difficult, as the cam accelerations are much higher.

Seven Valve

Alternatively, the cylinders are connected by two separate regenerators, which operate out of phase from each other. Each regenerator has 3 valves: a valve leading from the regenerator to the power cylinder 120, a valve leading from the regenerator to the compression cylinder 110, and a cold side valve connecting the regenerator to the exhaust. The compression cylinder 110 also has an intake valve. To avoid valve overlap, fluid is transferred on alternate revolutions through different regenerators. While this is a significantly more complex valving system, it has the advantage that all of the hot exhaust passes through a regenerator. If the regenerators double as catalytic converters, this scheme will be much more favorable for pollution control, as all of the exhaust gas can be treated in the regenerators.

On the downside, the complex valving system tends to be very difficult to design. In particular, the camshaft design is very difficult; the valves do not stay open long enough to permit efficient cam design.

This problem is not shared by the four valve design, which is a true two-stroke cycle design. In this design, the valves stay open long enough to permit good cam design, and all of the exhaust flows through the regenerator, which can double as a catalytic converter. Thus the four valve design is a simpler, more buildable design, and although it compromises efficiency somewhat, it retains most of the features for a very efficient engine. Thus the four valve system is the preferred embodiment.

From a technical standpoint, the engine is a two-stroke engine, in which there is an outside compressor. Because the engine is integral with the compressor, which supplies compressed air to the cylinder, the engine can be considered to be a four-stroke engine in which the intake and compression strokes occur in the compression cylinder 110, and the power and exhaust strokes occur in power cylinder 120.

FIG. 4 shows the valving for the four valve, one regenerator engine. The valve timing is typical of these engines. The four valves are:

1. Intake valve—valve 150 from the intake manifold to the compression cylinder 110
2. Transfer compression valve—valve 151 from the compression cylinder 110 to the regenerator 140
3. Exhaust valve—valve 152 from the passage between the compression cylinder 110 and the regenerator 140 to the exhaust manifold.
4. Transfer power valve—valve 153 from the power cylinder 120 to the regenerator 140.

Figure 5:
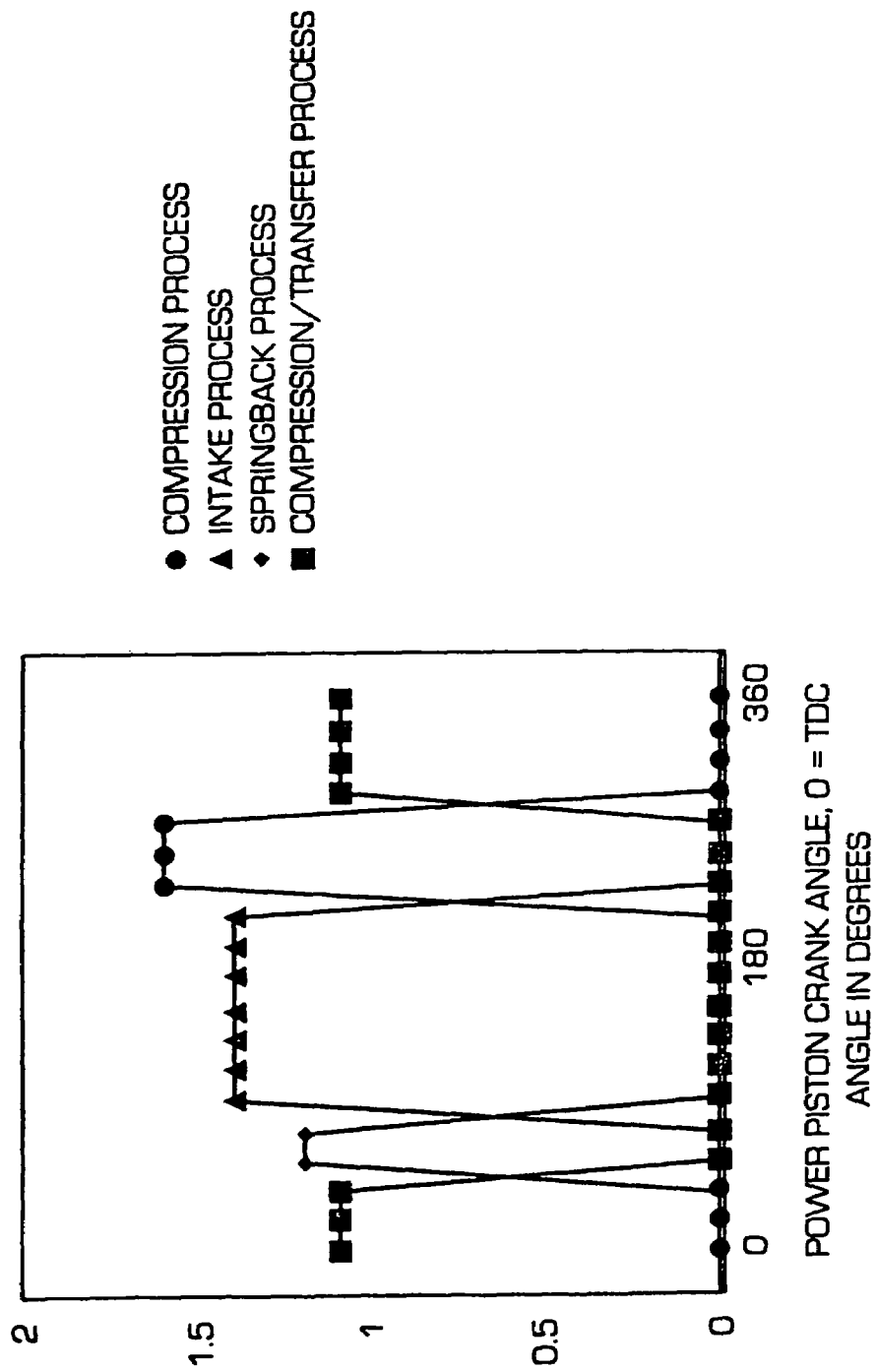
FIG. 5 illustrates a typical compression cylinder processes and valve opening diagram of a four-valve engine of the present invention.
Figure 6:
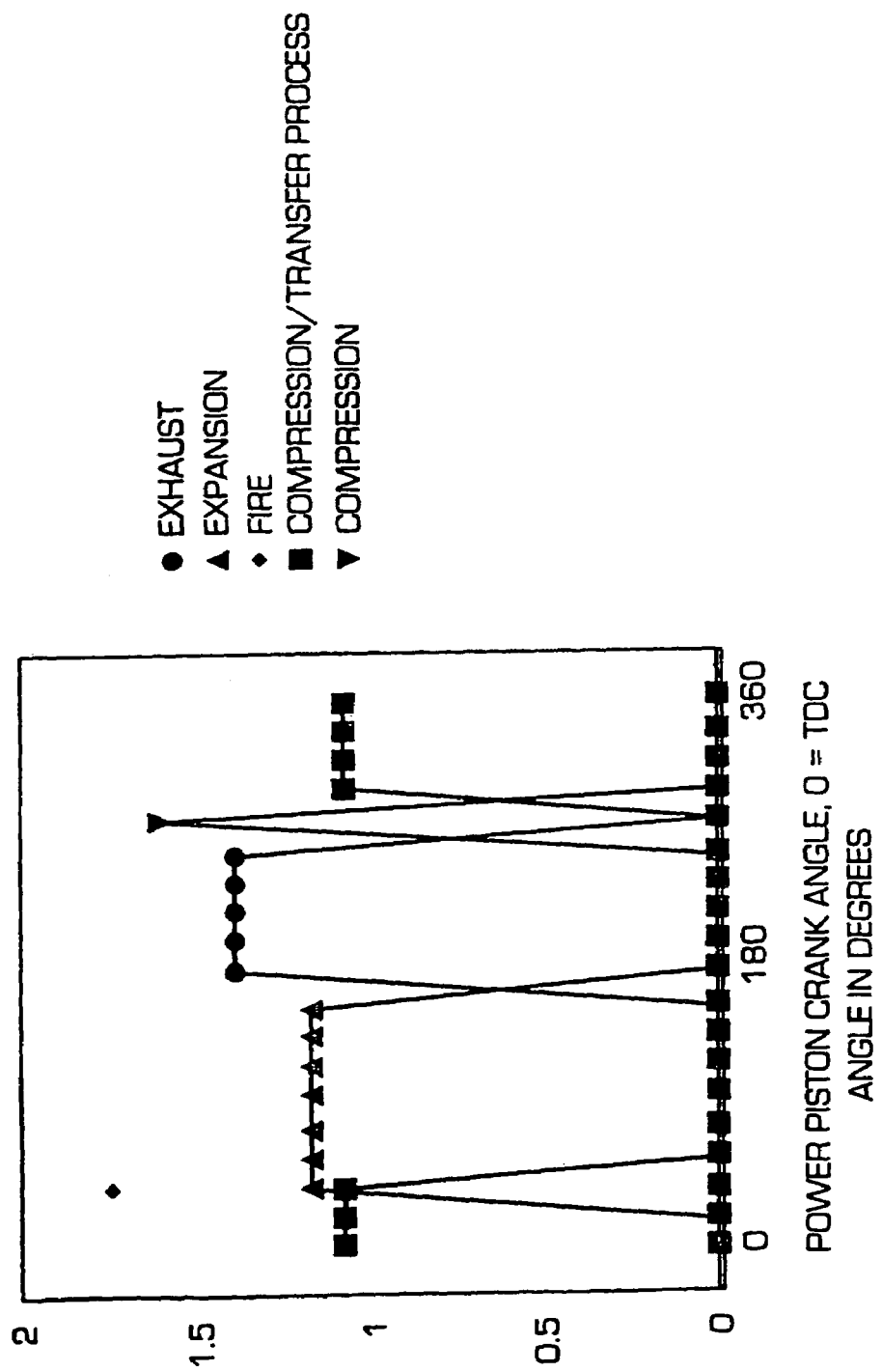
FIG. 6 illustrates a typical power cylinder process and valve opening diagram of a four-valve engine of the present invention.

FIG. 5 shows the compression cylinder 110 processes, and FIG. 6 shows the power cylinder 120 processes. The valves are closed when the valving diagram shows the valve at zero, and open when the valve is at a positive number. Similarly, the processes in FIGS. 5-6 are proceeding when the process is at a positive number. For clarity, valve openings and processes are shown at different levels. The x-axis is meant to show the progression of the cycle, rather than exact opening and closing (or start and end) times.

At the start of the cycle (power piston TDC) the power piston 125 has reached the top of its stroke and is starting to descend. The compression piston 115 lags the power piston 125, and so it is still on its upstroke. Both the transfer compression valve 151 and the transfer power valve 153 are open, so gases can flow freely from one cylinder to the other. Because the compression piston 115 is on its upstroke and the power piston 125 is on its downstroke, air is transferred from the compression cylinder 110, is heated passing through the regenerator 140, and goes into the power cylinder 120. All other valves are closed. This is the transfer portion of the compression/transfer portion of the cycle.

Figure 7:
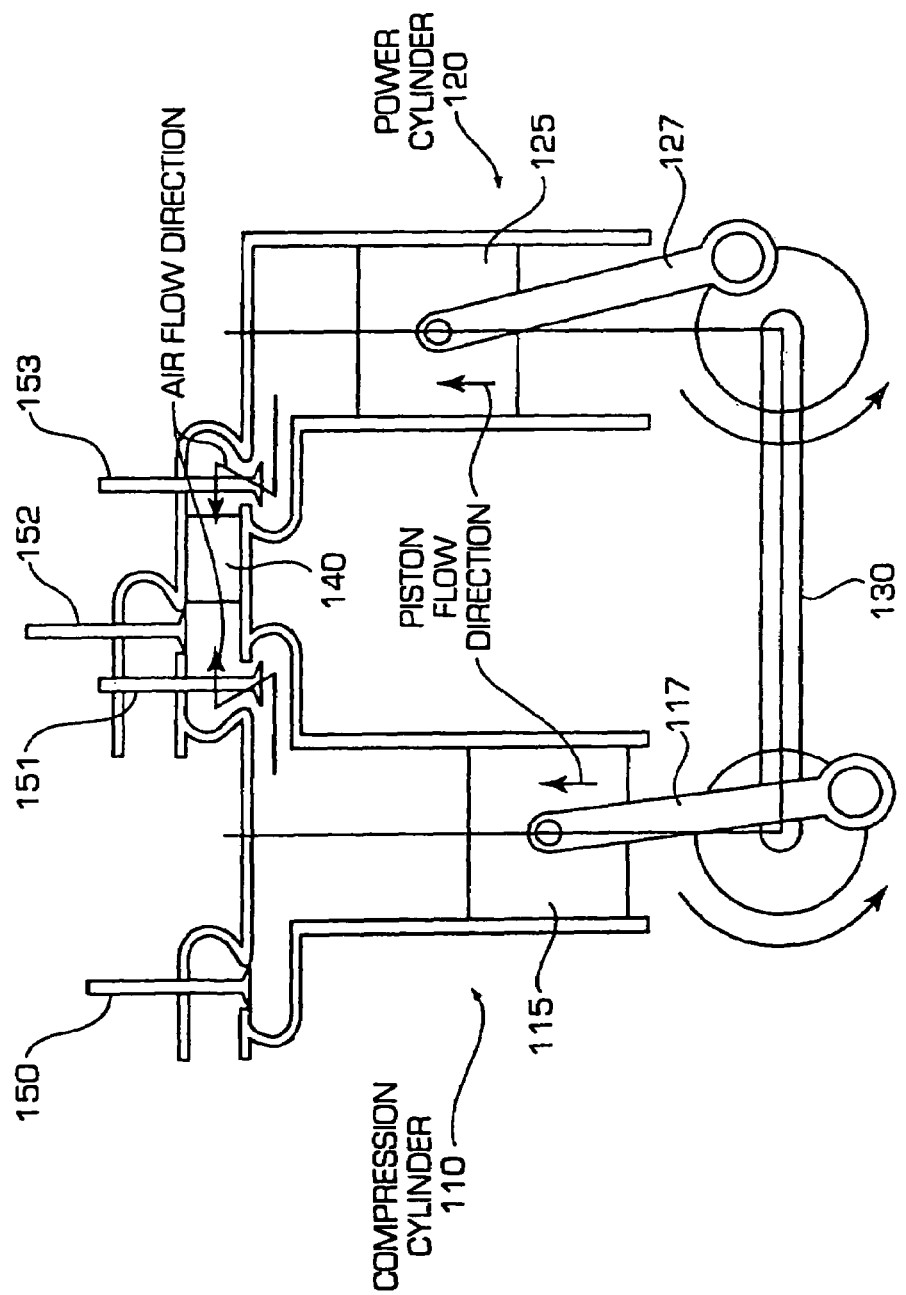
FIG. 7 illustrates a four-valve engine compression/transfer process of the present invention.
Figure 8:
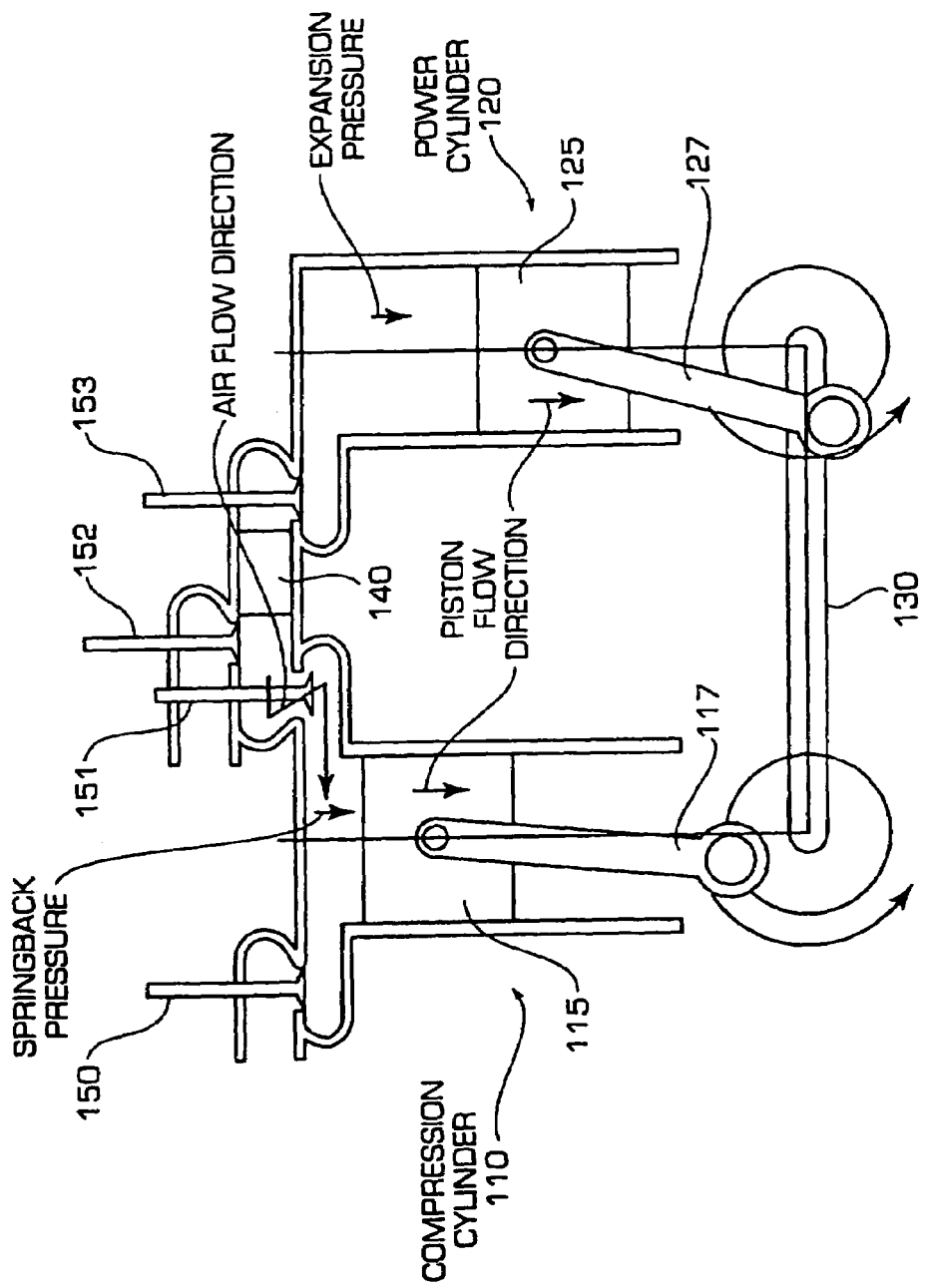
FIG. 8 illustrates a four-valve engine expansion and springback process of the present invention.

FIG. 7 shows the four valve engine during this process. This is the transfer portion of the compression/transfer portion of the cycle. The transfer power valve 153 closes, and the engine fires. Fuel has been injected into the power cylinder 120 prior to this time, and after an ignition delay it burns very rapidly. The fuel injection at 160 is timed so this rapid burn occurs at the correct time (fire point) in the cycle. The power cylinder 120 begins its expansion process, and the compression cylinder 110 begins its springback process. The transfer power valve 153, the intake valve 150 and the exhaust valve 152 are closed, and only the transfer compression valve 151 is open. FIG. 8 shows the four valve engine during this process.

Figure 9:
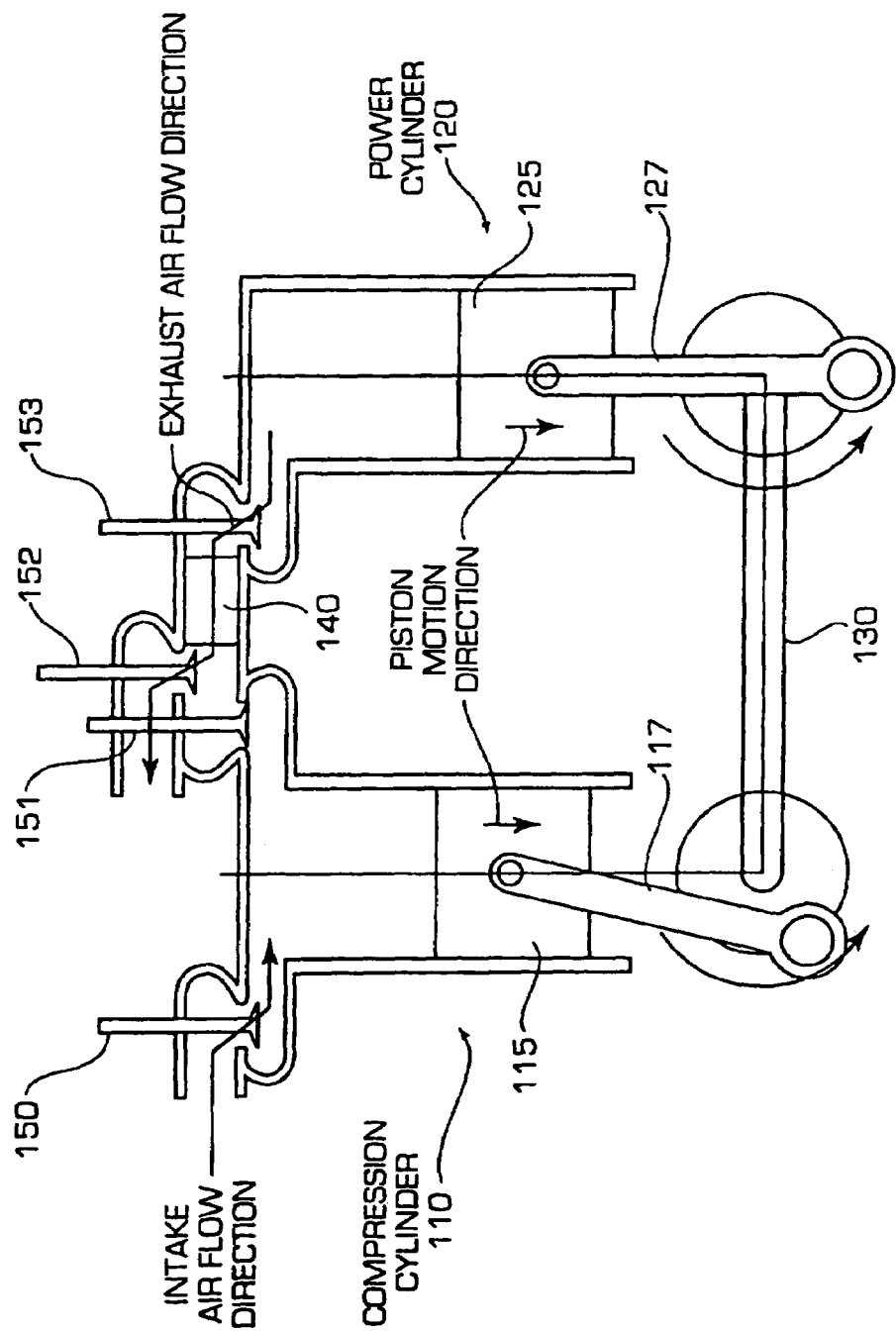
FIG. 9 illustrates a four-valve engine intake and exhaust process of the present invention.

The springback process ends, and so the transfer compression valve 151 closes while the intake valve 150 opens. This begins the intake process in the compression cylinder 110. At a somewhat later time, the exhaust valve 152 opens, and simultaneously or slightly after that time, the transfer power valve 153 opens. This begins the exhaust process in the power cylinder 120. FIG. 9 shows the four valve engine when both of these processes are underway.

The intake valve 150 closes, and this begins the compression process in the compression cylinder 110. At a different time, usually later, the exhaust valve 152 closes. This begins the compression process in the power cylinder 120. The two compression processes are different processes.

Finally, the transfer compression valve 151 opens. This begins the compression portion of the compression/transfer process, which completes the cycle.

Table 1 shows the valving for the one-regenerator engine variant having five valves, as shown in FIG. 2—an intake valve 150 and a transfer compression valve 151 (leading to the regenerator 140) on the compression cylinder 110 head, an exhaust valve 152 on compression side of the regenerator 140, a transfer power valve 153 (leading to the regenerator 140) and an exhaust valve 154 on the power cylinder 120 head. The exhaust valve 154 leads to a 2nd exhaust manifold. The valving in 30° increments is as follows:

1. Start: air is beginning to be transferred from the compression cylinder 110 to the power cylinder 120. As it is transferred, it passes through the regenerator 140, which heats it up. To facilitate transfer, the compression piston 115 lags the power piston 125. During transfer, the transfer compression valve 151 is open, the transfer power valve 153 open, and the other three valves are closed.
2. (30°) Transfer continues.
3. (60°) Transfer ends. The amount of crank angle for the transfer is equal to the lag of the compression piston 115 to the power piston 125. In this example, the lag was exactly 60°, but the exact amount of the lag can vary. This phase lag has an important effect, since it determines the compression ratio of the engine. At the end of transfer, the transfer compression valve 151 remains open, starting the springback process, and the transfer power valve 153 closes. This shuts off flow from the regenerator 140 to the power cylinder 120.
4. Combustion now takes place. Fuel is sprayed into the power cylinder 120, which fires. The air has picked up enough heat from the regenerator to ignite the fuel (>900° F.). In actual operation, the fuel would be sprayed slightly before this time, to allow time for the fuel to ignite.
5. (90°) The power cylinder 120 is on its expansion (power) process. The transfer compression valve 151 closes, and the intake valve 150 opens. The compression cylinder 110 begins its intake process. Water or vaporizable fuel can be added during the intake stroke via 161 to assist in providing the nearly isothermal compression later in the cycle.
6. (120°) Continuation of the expansion and intake processes.
7. (150°) Continuation of the expansion and intake processes.
8. (180°) Continuation of the intake process. The expansion process has ended and the regenerator exhaust valve 152 and the transfer power valve 153 open. This starts the blowdown process. Hot gases leave the power cylinder 120, go through the regenerator 140 and through the exhaust valve 152 and out the exhaust manifold. In this process, the regenerator 140 picks up heat, which it imparts to the next charge of air.
9. (210°) Intake and blowdown processes continue.
10. (240°) Intake process ends, so intake valve 150 closes. Blowdown continues in the power cylinder 120.
11. (270°) Compression process begins in the compression cylinder 110. Blowdown continues.
12. (300°) Blowdown through the regenerator 140 ends. The exhaust valve 152 closes, the transfer power valve 153 closes and the exhaust valve 154 opens. This routes the exhaust to the second exhaust manifold. Whatever heat is left in the power cylinder gases is lost. {Note: Calculations have shown that over 80% of the heat goes through the regenerator, but 100% of the exhaust passes through a regenerator in the seven valve two-regenerator engine and in the four valve engine. If the regenerator contains a catalytic converter and particulate filter, having only a portion of the exhaust may have a negative effect on emissions.} The transfer compression valve 151 on the compression cylinder 110 is opened, so that the gases in both the compression cylinder 110 and in the regenerator 140 and its passages will be compressed for the next cycle.

13. (330°) Compression and exhaust processes continue.
14. (360°) Power piston 125 reaches top dead center. The exhaust valve 154 closes, ending the exhaust process. The transfer power valve 153 opens, which begins the next cycle of transferring a fresh charge to the power cylinder 120.

TABLE 1

Valving and piston positions for the 5-valve engine (30 deg increments)

Figure 3A:
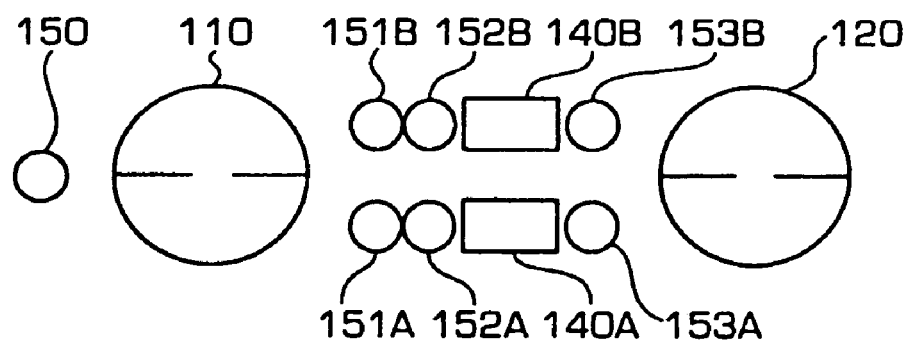

| crank pos. | compression | | | regenerator | power | | |
|---|---|---|---|---|---|---|---|
| | piston | intake | transfer | exhaust | piston | transfer | exhaust |
| start | 60bt | cl | op | cl | tdc | op | cl |
| 30 | 30bt | cl | op | cl | 30at | op | cl |
| 60 | tdc | cl | op | cl | 60at | cl | cl |
| | | | | | Combustion | | |
| 90 | 30at | op | cl | cl | 90at | cl | cl |
| 120 | 60at | op | cl | cl | 60bb | cl | cl |
| 150 | 90at | op | cl | cl | 30bb | cl | cl |
| 180 | 60bb | op | cl | op | bdc | op | cl |
| | | | | | Blowdown | | |
| 210 | 30bb | op | cl | op | 30ab | op | cl |
| 240 | bdc | cl | cl | op | 60ab | op | cl |
| 270 | 30ab | cl | cl | op | 90ab | op | cl |
| 300 | 60ab | cl | op | cl | 60bt | cl | op |
| 330 | 90ab | cl | op | cl | 30bt | cl | op |
| 360 | 60bt | cl | op | cl | tdc | op | cl | bt = before top dead center
at = after top dead center
bb = before bottom dead center
ab = after bottom dead center Table 2 shows the valving for the engine with two regenerators. There is one intake valve 150, and there are two sets of transfer compression valves 151a, 151b, exhaust valves 152a, 152b and transfer power valves 153a, 153b, accompanying the two regenerators 140a, 140b as shown in the top view of FIG. 3a. Thus, there are seven valves.—an intake valve and two transfer compression valves (one for each regenerator) on the compression head, a pair of exhaust valves on compression side of each regenerator, and two transfer power valves (one for each regenerator) on the power cylinder 120 head. The engine sequence in 30° increments is as follows:

1. Start: air is beginning to be transferred from the compression cylinder 110 to the power cylinder 120. As it is transferred, it passes through the regenerator 140a, which heats it up. To facilitate transfer, the compression piston 115 lags the power piston 125. During transfer, transfer compression valve 151a on the compression head and transfer power valve 153a on the power head are open; all other valves are closed.
2. (30°) Transfer continues.
3. (60°) Transfer ends. The amount of crank angle for the transfer is equal to the lag of the compression piston to the power piston. In this example, the lag was exactly 60°, but the exact amount of the lag can vary. This phase lag has an important effect, since it determines the compression ratio of the engine. At the end of transfer, the transfer power valve 153a closes. This shuts off flow from the regenerator 140a to the power cylinder 120. The transfer compression valve 151a remains open, starting the springback process.
4. (60°) Combustion. Fuel is sprayed by injector 160 into the power cylinder 120, which fires. The air has picked up enough heat from the regenerator to ignite the fuel (>900° F.). In actual operation, the fuel would be sprayed slightly before this time, to allow time for the fuel to ignite.
5. (90°) The power cylinder 120 is on its expansion (power) process. The intake valve 151 opens, the transfer compression valve 151a closes, and transfer compression valve 151b opens. This starts the intake process.
6. (120°) Continuation of the expansion and intake process.
7. (150°) Continuation of the expansion and intake process.
8. (180°) Continuation of the intake process. The expansion process has ended and the exhaust valve 152a and the transfer power valve 153a open. This starts the exhaust process. Hot gases leave the power cylinder 120, go through the regenerator 140a and out the exhaust valve 152a. In this process, the regenerator 140a picks up heat.
9. (210°) Intake and exhaust processes continue.
10. (240°) Intake process ends, so intake valve 150 closes. Exhaust continues in the power cylinder 120.
11. (270°) Compression process begins in the compression cylinder 110. Exhaust through regenerator 140a continues.
12. (300°) Compression and exhaust processes continue.
13. (330°) Compression and exhaust processes continue.
14. (360°) Power piston 125 reaches top dead center. The transfer power valve 153a closes, ending the exhaust process through regenerator 140a. The transfer power valve 153b opens, which begins the next cycle of transferring a fresh charge to the power cylinder 120. This time, the charge moves through regenerator 140b. The transfer compression valve 151b is already open; all other valves are closed.
15. (390°) Transfer continues.

16. (420°) Transfer ends. At the end of transfer, the transfer power valve 153*b* closes. This shuts off flow from the regenerator 140*b* to the power cylinder 120. The transfer compression valve 151*b* remains open, starting the springback process.
17. (420°) Combustion. Fuel is sprayed into the power cylinder 120, which fires. The air has picked up enough heat from the regenerator to ignite the fuel (>1000° F.). In actual operation, the fuel would be sprayed slightly before this time, to allow time for the fuel to ignite.
18. (450°) The power cylinder 120 is on its expansion (power) process, and the compression cylinder 110 is ending its springback process. The intake valve 150 opens, the transfer compression valve 151*b* closes, and transfer compression valve 151*a* opens. This starts the intake process.
19. (480°) Continuation of the expansion and intake processes.
20. (510°) Continuation of the expansion and intake processes.
21. (540°) Continuation of the intake process. The expansion process has ended and the exhaust valve 152*b* and the transfer power valve 153*b* open. This starts the exhaust process. Hot gases leave the power cylinder 120, goes through the regenerator 140*b* out the exhaust valve 152*b*. In this process, the regenerator 140*b* picks up heat.
22. (570°) Intake and exhaust processes continue.
23. (600°) Intake process ends, so intake valve 150 closes. Exhaust continues in the power cylinder 120.
24. (630°) Compression process begins in the compression cylinder 110. Exhaust through regenerator 140*b* continues.
25. (660°) Compression and exhaust processes continue.
26. (690°) Compression and exhaust processes continue.
27. (720°) Power piston reaches top dead center. The transfer power valve 153*b* closes, ending the exhaust process through regenerator 140*b*. The transfer power valve 153*a* opens, which begins the next cycle of transferring a fresh charge to the power cylinder 120. This time, the charge moves through regenerator 140*a*, which is where the cycle started. The transfer compression valve 151*a* is already open; all other valves are closed. Cycle repeats.

TABLE 2

Valving and piston positions for the 7-valve engine (30 deg increments)

| crank pos. | compression | | | regen1 | regen2 | power | | |
|---|---|---|---|---|---|---|---|---|
| | piston | intake | trn1 | trn2 | exh | exh | piston | trans1 | trans2 |
| start | 60bt | cl | op | cl | cl | cl | tdc | op | cl |
| 30 | 30bt | cl | op | cl | cl | cl | 30at | op | cl |
| 60 | tdc | cl | op | cl | cl | cl | 60at | cl | cl |
| | | | | | | | Combustion | | |
| 90 | 30at | op | cl | cl | cl | cl | 90at | cl | cl |
| 120 | 60at | op | cl | cl | cl | cl | 60bb | cl | cl |
| 150 | 90at | op | cl | cl | cl | cl | 30bb | cl | cl |
| 180 | 60bb | op | cl | cl | op | cl | bdc | op | cl |
| | | | | | | | Blowdown | | |
| 210 | 30bb | op | cl | cl | op | cl | 30ab | op | cl |
| 240 | bdc | cl | cl | op | op | cl | 60ab | op | cl |
| 270 | 30ab | cl | cl | op | op | cl | 90ab | op | cl |
| 300 | 60ab | cl | cl | op | op | cl | 60bt | op | cl |
| 330 | 90ab | cl | cl | op | op | cl | 30bt | op | cl |
| 360 | 60bt | cl | cl | op | cl | cl | tdc | cl | op |
| 390 | 30bt | cl | cl | op | cl | cl | 30at | cl | op |
| 420 | tdc | cl | cl | op | cl | cl | 60at | cl | cl |
| | | | | | | | Combustion | | |
| 450 | 30at | op | cl | cl | cl | cl | 90at | cl | cl |
| 480 | 60at | op | cl | cl | cl | cl | 60bb | cl | cl |
| 510 | 90at | op | cl | cl | cl | cl | 30bb | cl | cl |
| 540 | 60bb | op | cl | cl | cl | op | bdc | cl | op |
| | | | | | | | Blowdown | | |
| 570 | 30bb | op | cl | cl | cl | op | 30ab | cl | op |
| 600 | bdc | cl | op | cl | cl | op | 60ab | cl | op |
| 630 | 30ab | cl | op | cl | cl | op | 90ab | cl | op |
| 660 | 60ab | cl | op | cl | cl | op | 60bt | cl | op |
| 690 | 90ab | cl | op | cl | cl | op | 30bt | cl | op |
| 720 | 60bt | cl | op | cl | cl | cl | tdc | op | cl | bt = before top dead center
at = after top dead center
bb = before bottom dead center
ab = after bottom dead center Fuel Addition For any of the embodiments, fuel may be added at any one of the following places:

a) During the intake stroke. The fuels added here would be gasoline or other spark-ignition fuels in place of water at 161.

b) During the transfer from the compression cylinder 110 to the power cylinder 120. Because the air is hot after leaving the regenerator, the fuels added could be solid fuels such as charcoal which require gasification, or fuels which require reformation. Because the air is already compressed, these processes should proceed more rapidly, and the heat generated by these processes is not lost.

c) In the power cylinder 120. The fuel system described in section 3 was for Diesel fuel. There is the possibility of multi-fuel capability in this engine. Other fuels, such as gasoline or methane, may be added in the power cylinder 120. The gases are very hot in the power cylinder 120, which allows a multi-fuel capability.

Ignition is by two different processes. It can either be by spark ignition, if the fuel customarily is used in spark ignition engines (e.g. gasoline), or it can be by hot air if the fuel is customarily used in compression ignition engines (e.g. Diesel fuel). Note that in the 2nd case this is not a compression ignition engine; instead the air is sufficiently hot after leaving the regenerator to ignite the Diesel fuel. Thus, in this case it could be called a regenerator ignition engine.

In the case of spark ignition fuels, such as gasoline, ignition may be by spark ignition or by other means or by some combination thereof. This is particularly true if the air/fuel mixture is less than stoichiometric. Because the gases are so hot in the power cylinder 120 (over 1300 degrees F.), there is a possibility of either on very lean mixtures with gasoline. The flame speed increases with temperature, and there is less chance of flameout with the higher temperatures. Also, the temperature of the head and piston crown in the power cylinder 120 is above the self-ignition temperature of gasoline.

Heaters are placed in the regenerator, and glow plugs in the power cylinder 120, to assist starting. Starting is dependent on heating regenerator 140 and the surfaces in the power cylinder 120 sufficiently so that the fuel ignites when diesel fuel is used. If fuel is being generated by a gasification process, then the regenerator 140 needs to be hot enough to generate the fuel. In the case of spark ignition fuels such as gasoline, the starting procedure will depend on the air/fuel ratio being used.

Because the objective of the regenerator is to capture as much heat as possible, it is believed that it would be better to not cool the valve in the exhaust cylinder. In order for the valve to live, this would require a less than stoichiometric mixture to be burned at all times in the power cylinder 120. If a stoichiometric mixture is to be burned, the valve must be cooled. The cylinder will be cooled. The engine can either be air cooled or water cooled.

The major advantage of this engine is that its indicated thermal efficiency is projected be over 50%, using realistic models of the engine processes and heat losses. The brake specific fuel consumption is projected to be 40% less than that of the best current diesels, and 50% less than that of the best current gasoline engines.

The various engines have different efficiencies. The four valve engine has a compression/transfer process which compresses hot exhaust gases, causing inefficiencies. Depending on the valve timing and other factors, here are the indicated efficiencies of the various engines:

| | |
|---|---|
| 4-valve | 50–53% |
| 5-valve | 51–54% |
| 7-valve | 54–57% |

Projected indicated mean effective pressure: approximately 127 psi.

The four valve design is the least efficient of the three engines, but it is a much more buildable engine. The valving in the five and seven valve engines is very complex. In addition, the five valve engine has the problem that not all of the exhaust gases pass through the regenerator, making it somewhat problematic for pollution control.

The seven valve embodiment has poor buildability due to its complex valving and higher cost cam design.

For these reasons, the four valve engine is generally considered as the preferred embodiment. This engine, because it will usually run a less than stoichiometric mixtures, has far fewer pollution problems than current engines. The presence of the hot regenerator allows for the use of catalysts to efficiently remove pollutants from the exhaust stream.

A great advantage of this engine over other engines is that if the catalyst is combined with the regenerator, the engine will not start unless the catalyst is hot. Thus, cold start pollution can be designed out of the engine.

A second advantage is that the regenerator can also be used as a filter. It can trap soot and other carbon particles. Because it is so hot, the regenerator will consume these particles, or the reverse flow will push them back into the power cylinder 120 to be burned.

Thus, the problem of soot in a diesel engine is reduced or eliminated. It is known that a filter can be put on a diesel engine to eliminate this pollution, but it must be cleaned, i.e. the particles burned off periodically. The filter in the regenerator will be so hot that it constantly cleans itself, and the heat from the particles is transferred into the power cylinder 120 on the next cycle.

The preceding efficiency calculations assume a regenerator consisting of 0.0044" diameter 18/8 stainless steel cylindrical wire perpendicular to the flow. Other regenerator options include, but are not limited to, steel wool (of the suitable grade and size) and mesh perpendicular to the flow. These systems have been developed for Sterling engines, and are quite efficient. A ceramic filter is preferably incorporated into the regenerator to eliminate particulate pollution, with the filter being hot enough to burn off soot. The filter was not included in the above calculations. Heat transfer between the wire and the hot gases was included, as well as the pressure drop cause by drag from the wires.

Nothing in this document is to be construed as being the only timing possible. This includes both the valve timing and the lag between compression piston and power piston. In use of the present engine, the events described should follow roughly the sequence laid out herein, but the actual optimal timing for any particular engine may differ substantially from those given in these examples.

Several simulations have been made concerning the relative size of the cylinders, especially for the four valve engine. It has generally been found that if the compression cylinder 110 is somewhat larger (approximately 30% larger bore, same stroke) than the power cylinder 120, that the engine works best. The reasons for this are:

a) The compression cylinder 110 pushes more air into the power cylinder 120, increasing the pressure and the mep of the engine.

b) The extra air also fills the regenerator and the passages. There is enough air to fill them and push air into the regenerator. The effect of the volume of the deadspace (regenerator, passages, and valve clearance) is minimized. Thus a realistic deadspace volume (i.e. a volume sufficient to allow relative easy manufacture of the engine) can be realized without sacrificing much power.

c) During the compression/transfer process, hot gases are pushed from the power cylinder 120 to the compression cylinder 110. With a larger compression cylinder 110, there is more room for these gases, thus the deleterious effects of this process are minimized.

It has been found through simulation, that it is better to ignite the mixture a few degrees before the transfer process is complete. This is for the following reasons:

a) at this point, most of the mass of air has been transferred (90-95%);

b) during the last few degrees, pressure is falling and temperature is dropping in the power cylinder 120; (The compression piston has almost stopped, whereas the power piston is moving downward. The unfired gases in the power cylinder 120 are expanding and doing work on the power cylinder 120.)

c) thus, power is lost unless the cylinder is fired prior to the completion of the transfer process, i.e. before the compression piston reaches TDC;

d) when the power cylinder 120 fires, the power transfer valve must close (It will be necessary to have a valve that automatically closes in response to the pressure wave from firing of the cylinder.); and e) as the compression piston completes its stroke, it either compresses even more gases into the regenerator and passages after firing, or the intake valve opens and gases escape up the intake manifold. Without the springback process, this would be very wasteful of energy. Thus, the springback process, by recapturing this energy, is integral to a high efficiency engine, as it allows optimal ignition timing.

Although the basic engine used for the present invention has been described with respect to a few exemplary embodiments, numerous other modifications may be made without departing from the scope of the invention as defined by the claims. For instance, it is obvious that an engine in accordance with the present invention can be produced with numerous pairs of cylinders attached to a common driveshaft and/or with advanced materials such as ceramics and composites and/or with advanced valving systems such as solenoid or direct actuated valves.

Figure 14:
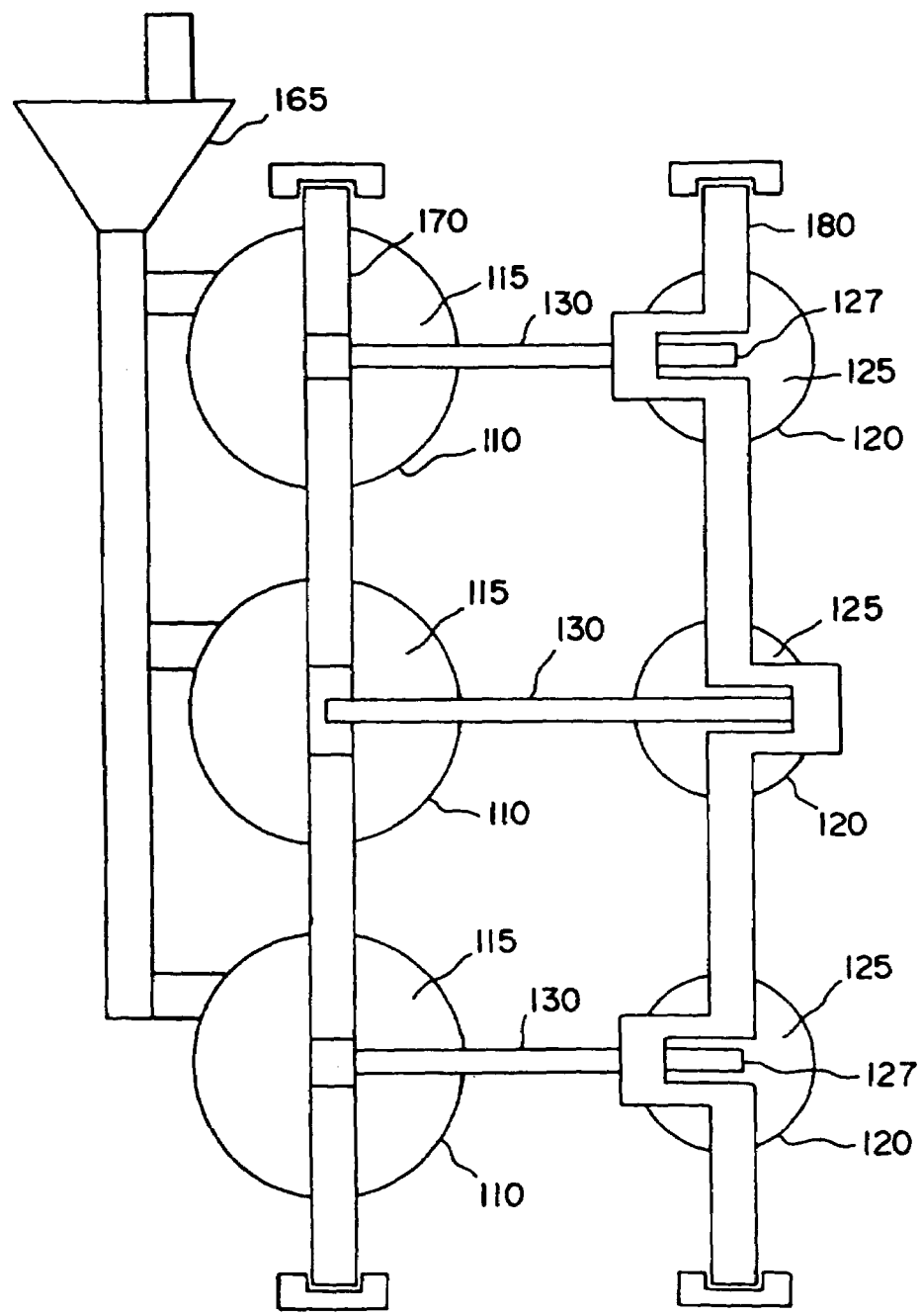
FIG. 14 illustrates the engine of the present invention in an embodiment using banks of cylinders.

FIG. 14 illustrates a schematic diagram of an embodiment of the invention wherein plural sets of pistons 115 and 125 are coupled to a common driveshaft 180. This embodiment also includes a turbocharger or supercharger 165 compressing intake air to compression cylinders 110 that, in this example, have a bore about 30% larger than that of power cylinders 120. Another shaft 170 can be used to help operate the compression pistons 115. This is but one example of the many possible engine arrangements.

The present invention is particularly drawn to use of controlled valve timing to control a naturally aspirated (NA) embodiment of the above-disclosed engine, but further includes embodiments that combine NA control with turbo or supercharging control of the above-disclosed engine.

FIG. 10 illustrates a P-V diagram of the cycle pressures of the basic engine of present invention relative to other engines. The P-V diagram shows representative pressures and MEP for a diesel naturally aspirated engine, the regenerative engine of U.S. Pat. No. 6,340,004, naturally aspirated, and the turbo-charged regenerative engine with a 4 bar intake pressure (3-bar boost). For the regenerative engine, the compression stroke occurs in one cylinder and the power stroke in another cylinder. Note that the turbocharged regenerative engine has a peak pressure less than that of the diesel, but its MEP is more than twice as much.

Use of a supercharger for this engine is attractive for a number of reasons. One is the fact that with its low compression ratio, high rates of supercharging (on the order of 4 atmospheres) are possible without excessive peak pressures in the cylinder. This has two advantages:

1) Improved efficiency: Supercharging increases the indicated mean effective pressure of the engine significantly without a corresponding increase in the friction MEP, so that the mechanical efficiency, and thus the brake efficiency, improves.

2) Engine control without throttling: The engine of the invention cannot sustain for long periods of operation a large shift in the fuel ratio. A high fuel ratio implies high peak temperatures that will cause reduced efficiency and increase the operating temperatures above the normal region, thus causing undesirable engine wear, whereas a low fuel ratio could cause temperatures in the regenerator to drop to the point where the air leaving the regenerator and entering the power cylinder cannot fire the fuel without additional heating. Thus the fuel ratio is confined within distinct limits and cannot be varied, as in a diesel engine, to govern the engine output. Governing the engine output comes from a combination of minor variation in the fuel ratio and variation in the mass of air entering the cylinder. Because the engine can accept high rates of supercharging, varying the pressure boost and maintaining the fuel ratio within prescribed limits is an attractive technique for controlling the engine output without throttling. This would make the engine efficient over a wide range of speeds and loads, which would make it more efficient in ground vehicle applications, where these conditions are frequently encountered.

FIG. 11 illustrates a typical supercharged embodiment of the present invention.

FIG. 12 illustrates a typical turbocharged embodiment of the present invention. Turbo-charging: Supercharging, as defined in the above paragraphs, means using a separate compressor to increase the intake air pressure and density. Any suitable compressor, such as a roots or centrifugal, may be used. Turbo-charging is the use of a turbine in the exhaust to drive the compressor. For cases where the turbine power cannot drive the compressor at all speeds and loads, the compressor is divided up into two stages, and the turbine only drives one of the stages, with the engine driveshaft driving the other stage. Turbo-charging increases the efficiency of the engine by capturing the more of the energy of the exhaust.

FIG. 13 illustrates a typical turbo-compounded embodiment of the present invention. Turbo-compounding: If the turbine power exceeds what is needed to drive the compressor, then the use of turbo-compounding becomes possible. Due to its added complexity, turbo-compounding is only feasible where very high rates of supercharging are to be used. This is because only very high rates of supercharging provide the pressure ratios allow the turbine to both drive the compressor and develop significant additional power (significant compared to the engine output). Turbo-compounding can be accomplished in two ways:

1) The turbine and compressor are both linked to the engine crankshaft through gears. This arrangement has been used on several engines, most notably the Napier Nomad. Excess energy from the turbine is added to the engine output through the crankshaft. Efficiency is improved because of this additional power from the turbine.

2) The turbine and compressor are linked in a common shaft. A motor-generator or other load is also on the shaft. If needed (as in starting) the motor-generator can turn the turbine/compressor shaft. During operation the generator can convert excess turbine energy into electrical output. This arrangement removes the gearing, which can prove troublesome. The usually the turbine and compressor rotate at much higher speeds than the crankshaft, In turbo-compounding, the turbine and compressor act as a bottom-cycling engine, so that the engine becomes a two stage engine. This can greatly improve the fuel economy of the engine.

The art of turbine and compressor design is well advanced; all of this art, such as compressor type, turbine type, matching of turbine to compressor, intercooling and aftercooling, material selection such as ceramic coatings, etc., are within the skill of those in the art and are applicable to the present invention without departing from the scope. Supercharging, turbo-charging (or turbo-supercharging) and turbo-compounding arrangements are also well described in the literature.

While the turbo and supercharged control of the engine of the present invention has been claimed in co-pending application Ser. No. 10/638,208, it is anticipated that the use of this type of engine control can be combined with the naturally aspirated (NA) engine control presently disclosed so as to control the engine while idling. In this manner, the engine can be efficiently operated at all times, i.e., both while idling and while under power.

Indeed, in city traffic, up to 12% of all of the fuel that a passenger car consumes is burnt at idle. At these times, the engine is still called upon to provide power for air conditioning, power steering, electricity and other accessories. Idling also consumes considerable amounts of fuel in diesel locomotives, since they can idle for hours before starting a trip. Efficient operation in these regimes is vital for overall fuel economy. It is also true that when driving on level roads, a passenger car engine provides only a fraction of the power (~⅛) that is required during acceleration. Similarly, an airplane will require less than ¼ of the power during cruising that it requires at take-off. Much depends on how the engine is sized for the vehicle, but in general it can be said that few engines operate at peak power most of the time.

It is also desirable to control a naturally aspirated (NA) engine as disclosed in U.S. Pat. No. 6,340,004 based upon cost considerations. Having a turbo or supercharger adds to the cost of an engine. Therefore, it would be beneficial to eliminate this cost for certain applications, yet control the NA regenerative engine. It is also highly desirable if the control does not come through throttling since the additional pumping losses associated with throttling reduce the fuel economy of spark-ignition (SI) engines wherever throttle bodies are employed. Throttling is the current technology in passenger cars. The present invention maintains control of the NA regenerative engine though valve timing.

A typical valve sequence for an embodiment when exhausting the regenerative engine is as follows:

1) exhaust valve 152 opens. This opens the valve 152 from the exhaust manifold to the passage between the cylinders. This valve is on the cool (compression cylinder 110) side of the passage. The cool and hot sides are separated by the regenerator 140. Not much is happening after this event, so the time between events 1 & 2 is called the transition 1 period.

2) power valve 153 opens. This opens the valve 153 from the power cylinder 120 to the passage between the cylinders. Hot exhaust gases begin to flow from the power cylinder 120 to the exhaust manifold. Because of the placement of the valves, the hot gases flow through the regenerator 140 first, heating it up, on the way to the exhaust manifold. This is the exhaust period 3) exhaust valve 152 closes. This is the transition 2 period.

4) transfer compression valve 151 opens. This opens the valve 151 from the compression cylinder 110 to the passage between the cylinders. Like the exhaust valve 152, this valve 151 is on the cool side of the passage. After this valve 151 opens, the combined gases in the two cylinders and the passage are compressed and (mostly) transferred to the power cylinder 120.

Under the new valve scheme of the present invention, if the engine control period is varied, this would have the effect of reducing the amount of gas entering the power cylinder, thus also reducing the power output of the engine. It thus allows the engine output to be controlled when operating NA.

A number of different valve systems can produce this effect, including solenoid-type valves. In effect, any valve actuation system that allows the requisite flexibility can be used. However, virtually all IC engines use poppet valves actuated by camshafts. Hence the preferred embodiment is chosen to be inexpensive and compatible with current designs.

A preferred embodiment has the following elements:

1) 2 camshafts are used. On one camshaft are cams to operate the intake, transfer compression and power valves. The second camshaft has the exhaust cams.

2) The second camshaft also has a differential element, such as a planetary gear or a differential, or in some cases a chain drive where the chain length can be varied. There are many such schemes, and some of them are on currently produced SI engines. What they allow is that the second (exhaust) camshaft can be rotated with respect to the first camshaft and the crankshaft, and this control is done by a separate actuator. In the regenerative engine, this rotation varies the engine control period, which in turn controls the engine output.

Simulation Results:

To test this scheme of NA regenerative engine control, a simulator was written and results obtained. The simulator included modeling for the entire engine cycle. Aside from heat losses, everything which affects the indicated efficiency (ieff) and indicated mean effective pressure (imep). The simulator had the following parameters:

| valve timing: | |
|---|---|
| Power valve opening time: | 150° aTDC |
| Transfer compression valve opening time: | 270° aTDC |
| Exhaust valve open duration | 120° |
| Exhaust valve opening: | 145°–210° aTDC |
| Exhaust valve closing: | 265°–330° aTDC |
| Exhaust valve phase change: | 0°–65° |

The following results were obtained from the simulations.

Figure 15:
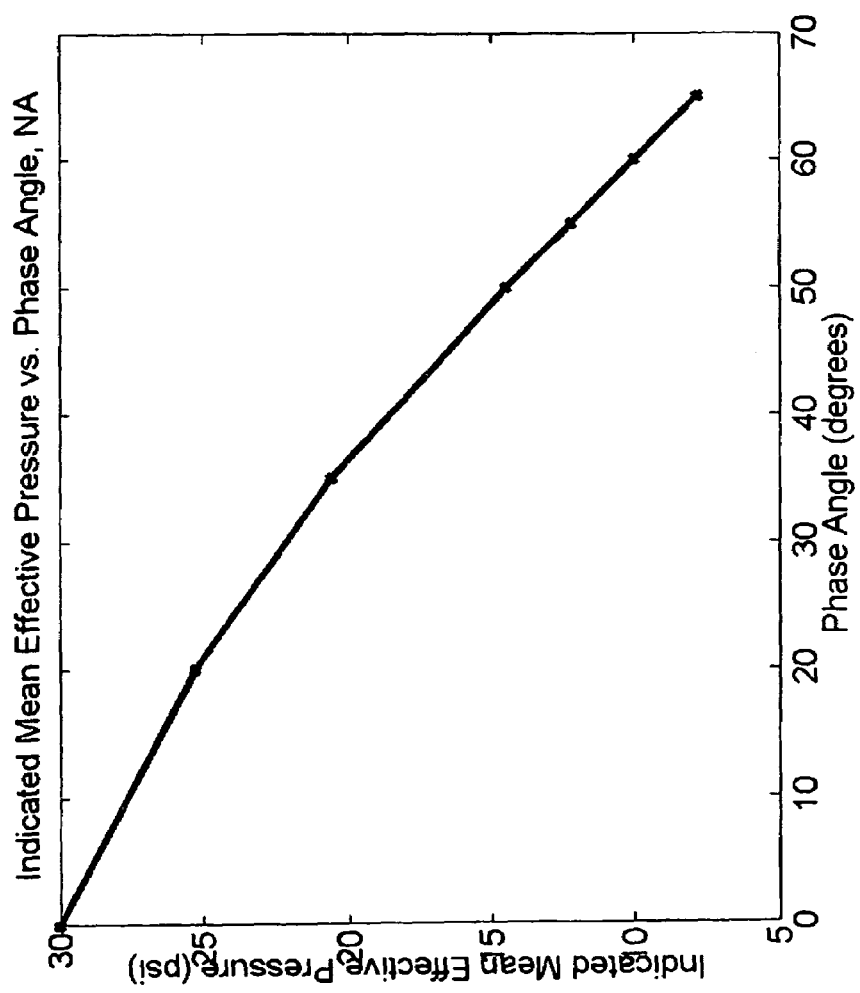
FIG. 15 illustrates indicated mean effective pressure vs. phase angle in accordance with a simulated embodiment of the present invention.

FIG. 15 illustrates the indicated mean effective pressure (imep) vs. phase angle. As can be readily seen, the imep is strongly dependent on the phase angle.

Figure 16:
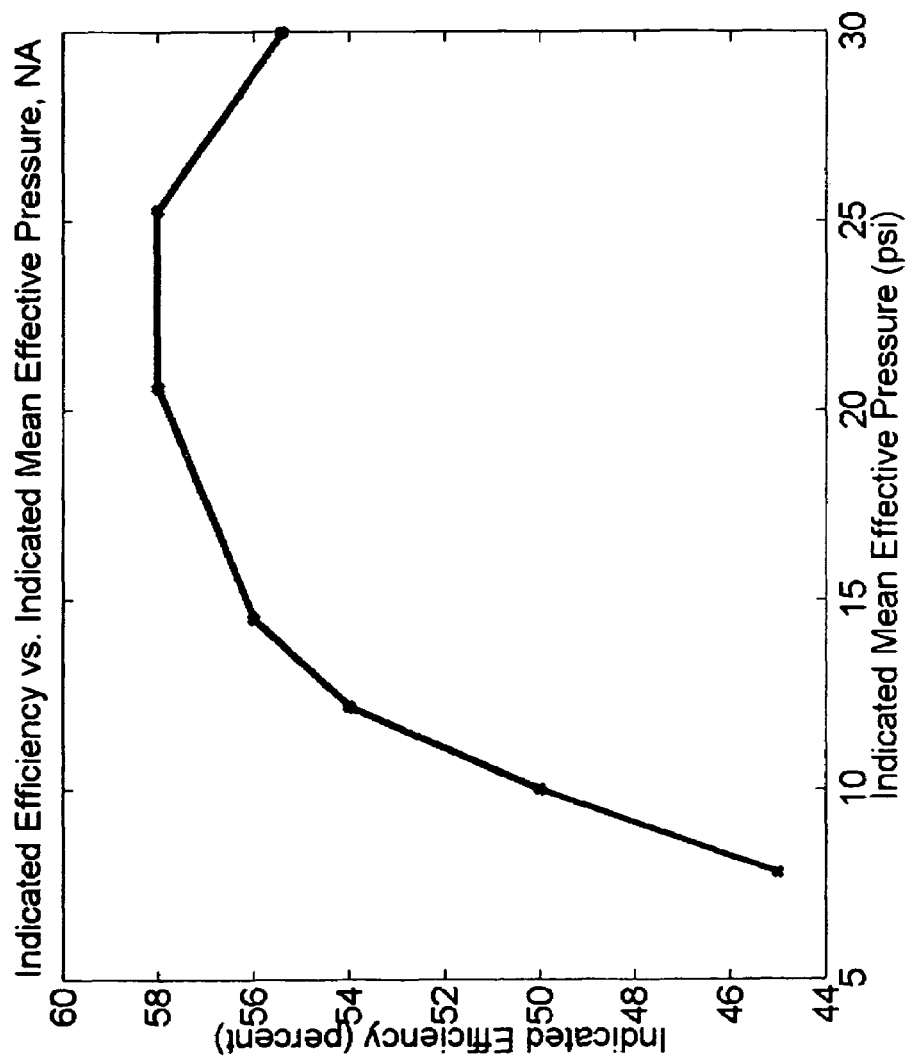
FIG. 16 illustrates indicated efficiency vs. indicated mean effective pressure in accordance with a simulated embodiment of the present invention.

FIG. 16 illustrates the indicated efficiency (ieff) vs. indicated mean effective pressure (imep) for NA engine control. In this case, the efficiency is shown to be relatively insensitive to the change in the imep. Even down to very low loads (imep~8 psi), the indicated thermal efficiency is quite high (45%). At these loads, the engine is really idling, and considering that all of the losses, such as pumping losses have been included in the calculations, this is a fairly high number. These losses also include the fact that at the exhaust opening, the power cylinder pressure is below atmospheric pressure, which adds to pumping losses. At higher loadings, the efficiency exceeds 50%.

Figure 18:
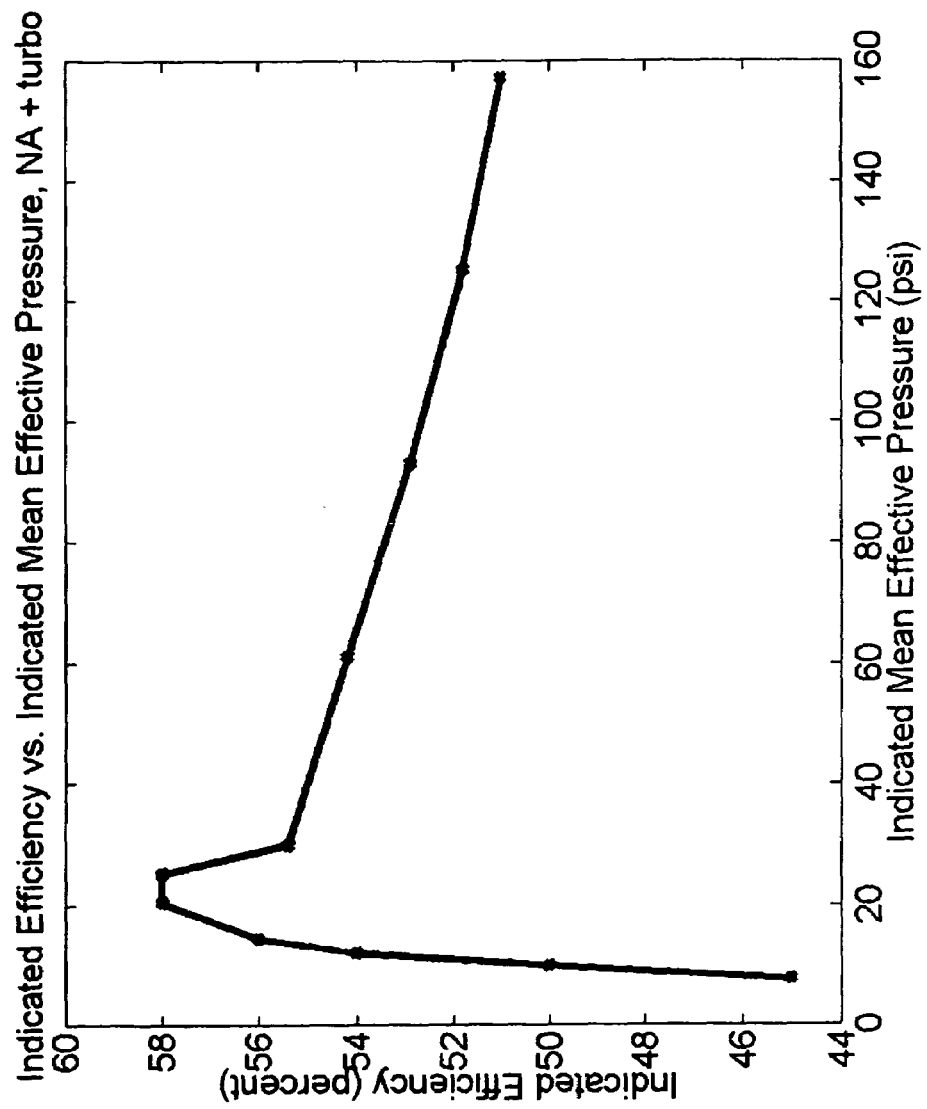
FIG. 18 illustrates the indicated efficiency vs. indicated mean effective pressure in accordance with a simulated naturally aspirated and turbo charged embodiment of the present invention.

The next results are of a full simulation of engine control, including (turbo) supercharging in addition to the NA engine control. The plot in FIG. 18 is of the indicated efficiency vs. indicated mean effective pressure when using both NA and turbo control. This figure includes varying levels of turbo boost, and it illustrates that the efficiency does not drop off very much as the turbo boost is increased.

Figure 17:
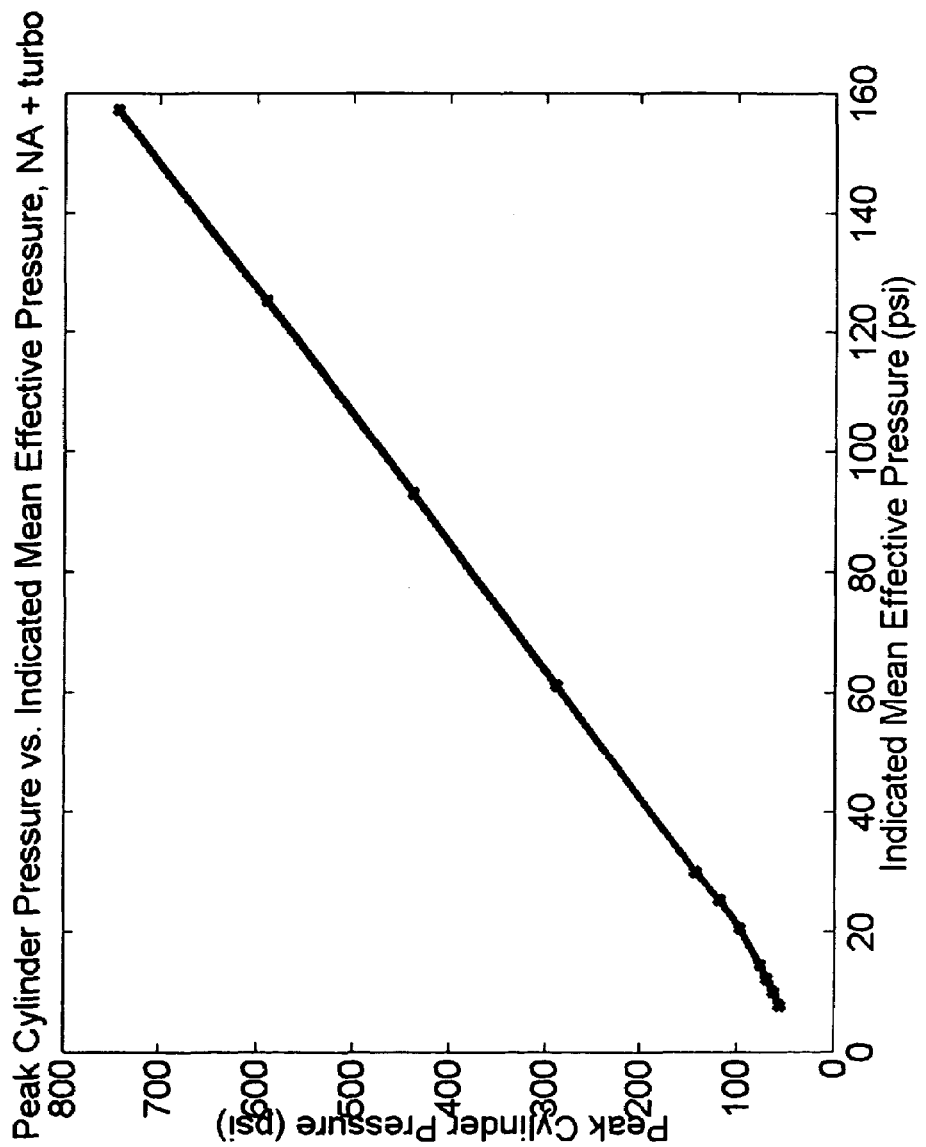
FIG. 17 illustrates the peak cylinder pressure vs. indicated mean effective pressure in accordance with a simulated naturally aspirated and turbo charged embodiment of the present invention.

FIG. 17 illustrates peak cylinder pressure for the case of FIG. 18. Note that the pressures are quite low compared to current turbo-charged diesel practice (2100 psi, circa 2005).

Figure 19:
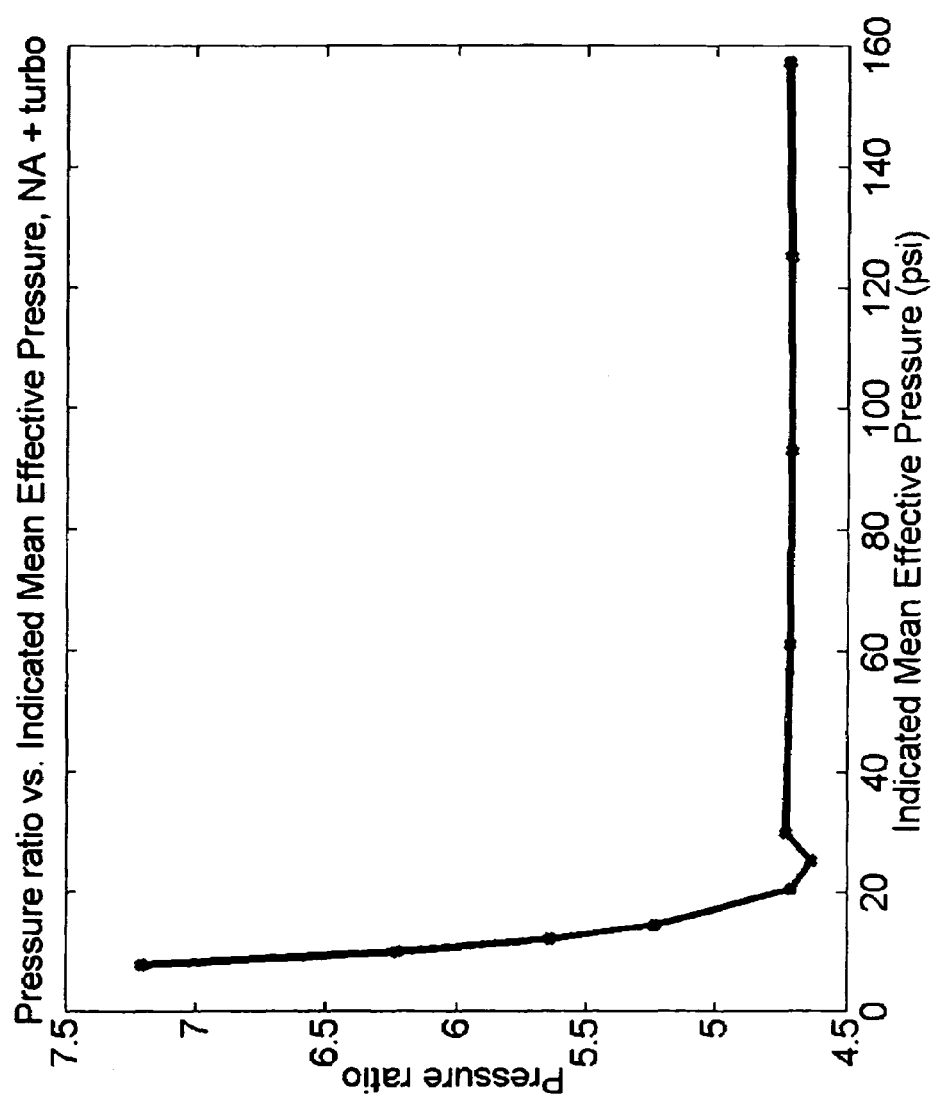
FIG. 19 illustrates the pressure ratio vs. indicated mean effective pressure in accordance with a simulated naturally aspirated and turbo charged embodiment of the present invention.

One other variable to be considered is the ratio of the peak pressure to mean effective pressure. At whatever power level (mep) is chosen for the engine, the engine parts must be made heavy enough to withstand the peak cylinder pressure. On the other hand, heavy pistons produce high inertial loads, which contribute to increased engine friction. High engine pressures also affect valve train and crankshaft friction adversely, as well as adding cost, weight and durability problems to the engine. FIG. 19 illustrates the pressure ratio vs. indicated mean effective pressure for this simulation.

It should be noted that for Otto cycle engines, this pressure ratio is highly dependent on the compression ratio, and increases as the compression ratio increases. Except for the lowest imeps, the pressure ratio of the present invention is approximately 4.75. This compares to a pressure ratio of approximately 15 for currently available passenger turbo-diesels (circa 2005).

A further consideration involved with controlling the NA regenerative engine with variable valve timing is the matter of residual, burned gases from the power cylinder. In the previously disclosed regenerative engine, prior to any change in the timing of the present invention, the exhaust valves closes with the power cylinder at 270° aTDC, i.e. 90° bTDC. This means that approximately half of the cylinder volume is filled with unexpelled exhaust gases. In addition, the hot dead space contains exhaust gas, the regenerator contains exhaust gas and the cool dead space contains exhaust gas. All of these gases are pushed back into the power cylinder prior to any fresh air being delivered to the power cylinder. As such, any scheme that reduces the amount of air reaching the power cylinder has to take the residual gases into account.

By closing the exhaust valve late, the following happens:

1) The power cylinder keeps pushing the exhaust gases out (up to 25° bTDC). This effectively clears the power cylinder of exhaust gases.

2) The cool dead space now contains (partially) fresh air, since the transfer valve opened and pushed some fresh air into it.

3) The resulting effect is less residual gas in the system, so firing should be more effective at low power.

Classification of the Control System

The engine output is, in all cases, controlled by the amount of air being transferred from the cool side (compression cylinder) to the hot side (power cylinder). The temperature does not change in the hot side, due to the regenerator. Therefore the two ways of changing the amount of mass in the hot side are by changing the pressure, and changing the volume.

$$PV=mRT, m=\text{mass and } V=\text{volume}$$

$$m=P*(V/RT)$$

The volume can be controlled by changing the timing of the power valve closure. An early closure does not allow for much air to be transferred into the power cylinder. The pressure is completely controlled by the effective compression ratio of the engine. Using valve phasing to spill air out of the system reduces the overall compression ratio and therefore the power output of the engine.

Two ways to manipulate compression ration are: 1) Manipulation of the clearance volumes; and 2) Manipulation of the amount of air in the compressor prior to transfer. For manipulation of clearance volumes, a device such as a screw plug or cylinder 201 can be placed on the cool side above the compression cylinder in cold dead space 202, as shown in FIG. 20. When it is screwed in, the cool dead space 202 above the compression cylinder decreases, the compression ratio goes up, and the power goes up. When it is screwed out, the cool dead space increases, the compression ratio goes down, and the power goes down.

Manipulation of the amount of air in the compression cylinder prior to transfer can be done by limiting the amount of air in the compression cylinder. One of ordinary skill in the art knows a variety of ways of manipulating the valve timing and duration to achieve this result. For example, the intake valve can be manipulated to limit the amount of air admitted. Unthrottled SI engines which do this have been developed and successfully tested. While throttling the engine is wasteful, it is also a very cheap way to manipulate the amount of air.

Spilling air from the compression cylinder is another way to manipulate the amount of air reaching the power cylinder. Various methods of accomplishing this include keeping the intake valve open so that the fresh air is pushed back out the intake manifold, and keeping the exhaust valve open so that air from the compression cylinder, rather than being transferred is pushed out the exhaust valve.

Measures can also be taken to limit the residual exhaust gases. Depending on the design, residual exhaust gases may represent a problem. The regenerative engine acted upon by the present invention tends to have considerable residual exhaust gases. In this engine, in general, the exhaust closing will be relatively early, so that considerable gases are trapped in the power cylinder. In addition, the hot dead space has exhaust gas, the regenerator has exhaust gas and the cool dead space has exhaust gas. All of these gases are pushed back into the power cylinder, and then the fresh air gets in there. Since the fuel ratio is low (~0.2-0.25) this in not a bad situation, but some steps can be taken to improve it.

One method involves scavenging the cool dead space. By opening the transfer valve before the exhaust valve closes, some fresh air is pushed into the cool dead space, thus reducing the amount of residual gases in the system. Transfer then begins when the exhaust valve closes.

Another method involves keeping the exhaust valve open longer. This directly reduces the amount of residual exhaust gases in the power cylinder. Two simple schemes are: (i) shifting the phase of the exhaust valve relative to the other valves, so that it opens and closes later; this achieves both scavenging and longer exhaust valve opening; and (ii)

shifting the phase of the transfer compression and the intake valve in addition to the keeping the exhaust valve open longer; this pushes excess air out the intake manifold rather than the exhaust manifold, which may have advantages for pollution control because the exhaust may be cooled too much from scheme (i). Thus, it achieves reduction of exhaust gases in the power cylinder. Likewise, scavenging can be achieved by overlapping the exhaust closing with the transfer valve opening.

A system and method for providing control to a naturally aspirated regenerative engine without using throttling have been described. It will be understood by those skilled in the art that the present invention may be embodied in other specific forms without departing from the scope of the invention disclosed and that the examples and embodiments described herein are in all respects illustrative and not restrictive. For example, while compression-side cooling is not possible in a typical Diesel engine since the heat of compression is needed for fuel ignition, because the present engine relies upon the regenerator to heat the compressed air, cooling of the compression cylinder/head 212 can be employed to increase the efficiency of the present engine using various means 211 such as cooling fins, air cooling, liquid cooling and oil-bath cooling, as illustrated in FIG. 21. Those skilled in the art of the present invention will recognize that other embodiments using the concepts described herein are also possible. Further, any reference to claim elements in the singular, for example, using the articles "a," "an," or "the" is not to be construed as limiting the element to the singular.

I claim:

1. An internal combustion engine, comprising:
   a compression cylinder having an intake valve and at least one transfer compression valve;
   a compression piston mounted for reciprocation inside said compression cylinder;
   a power cylinder having at least one transfer power valve;
   a power piston mounted for reciprocation inside said power cylinder;
   a passage connected between each transfer compression valve and transfer power valve, said passage including a regenerator and a regenerator exhaust valve between said transfer compression valve and said regenerator; and
   means to vary an amount of gas entering the power cylinder during naturally aspirated engine operation to control engine output power without throttling.

2. The internal combustion engine of claim 1, further comprising a supercharging means operable for engine control without throttling, said supercharging means varying pressure boost while maintaining a fuel ratio within prescribed limits so as to vary engine output.

3. The internal combustion engine of claim 2, wherein the supercharging means is selected from the group consisting of superchargers, turbochargers, and turbo-compounders.

4. The internal combustion engine of claim 1, wherein the engine comprises a single transfer compression valve, a single transfer power valve, a single passage, and a single regenerator.

5. The internal combustion engine of claim 1, wherein the engine comprises a pair of transfer compression valves, a pair of transfer power valves, a pair of passages, and a pair of regenerators.

6. The internal combustion engine of claim 1, further comprising means for injecting water into said compression cylinder.

7. The internal combustion engine of claim 1, further comprising means for injecting fuel into said compression cylinder.

8. The internal combustion engine of claim 1, further comprising means for injecting fuel into said power cylinder.

9. The internal combustion engine of claim 1, further comprising means to control valve timing to vary the amount of gas entering the power cylinder during naturally aspirated engine operation.

10. The internal combustion engine of claim 9, wherein the means to control valve timing includes the following valve timing parameters: power valve opening at approximately 150° after top dead center (aTDC) of the power piston; transfer compression valve opening at approximately 270° aTDC; exhaust valve opening between approximately 145°-210° aTDC; and exhaust valve closing between approximately 265°-330° aTDC, such that an exhaust valve phase varies between 0°-65°.

11. An internal combustion engine process with thermal efficiency greater than 50%, comprising:
    drawing air though an intake valve into a compression cylinder;
    closing said intake valve and compressing said air with a compression piston;
    opening at least one transfer compression valve to pass compressed air through a regenerator and a transfer power valve to supply heated compressed air to a power cylinder;
    combusting fuel in said heated compressed air to drive said power piston;
    opening said transfer power valve and to pass exhaust gas through said regenerator and a regenerator exhaust valve to reclaim exhaust gas heat; and
    controlling the engine during naturally aspirated engine operation by varying the an amount of gas entering the power cylinder to control engine output power without throttling.

12. The internal combustion engine process of claim 11, wherein compressing said air with a compression piston further includes cooling of said air to remove heat of compression.

13. The internal combustion engine process of claim 11, further comprising controlling clearance volumes to vary an amount of gas entering the power cylinder during naturally aspirated engine operation.

14. The internal combustion engine process of claim 11, further comprising controlling the engine with supercharging by varying pressure boost while maintaining a fuel ratio within prescribed limits so as to vary engine output without throttling, wherein said controlling the engine with supercharging is controlled by a method selected from the group consisting of supercharging, turbo-charging, and turbo-compounding.

15. The internal combustion engine process of claim 11, wherein said air is passed though a single transfer compression valve, a single transfer power valve, a single passage, and a single regenerator in a two-stroke cycle process.

16. The internal combustion engine process of claim 11, wherein said air is alternately passed though a pair of transfer compression valves, a pair of transfer power valves, a pair of passages, and a pair of regenerators in a four-stroke cycle process.

17. The internal combustion engine process of claim 11, wherein the compression of air in said compression cylinder is nearly isothermal by the addition of water or fuel to said air.

18. The internal combustion engine process of claim 11, wherein fuel is injected into said air in compression cylinder or said power cylinder and combustion is initiated by a method selected from the group consisting of hot air ignition, spark ignition, or a combination thereof.

19. The internal combustion engine process of claim 11, further comprising controlling valve timing to vary an amount of gas entering the power cylinder during naturally aspirated engine operation.

20. The internal combustion engine process of claim 19, further comprising controlling valve timing so as to accomplish: power valve opening time at approximately 150° after top dead center (aTDC) of the power piston; transfer compression valve opening time at approximately 270° aTDC; exhaust valve opening between approximately 145°-210° aTDC; and exhaust valve closing between approximately 265°-330° aTDC, so as to vary an exhaust valve phase change between 0°-65°.

21. The internal combustion engine process of claim 19, further comprising controlling valve timing to:
 scavenge cool dead space associated with the compression cylinder; and
 reduce an amount of exhaust gas in the power cylinder, so as to reduce an amount of residual exhaust gas in the power cylinder before firing.

22. The internal combustion engine process of claim 11, further comprising choosing valve timings that scavenge cool dead space associated with the compression cylinder so as to reduce an amount of residual exhaust gas in the power cylinder before firing.

* * * * *